United States Patent
Koike et al.

(10) Patent No.: US 7,058,271 B2
(45) Date of Patent: Jun. 6, 2006

(54) PLASTIC OPTICAL FIBER

(75) Inventors: Yasuhiro Koike, 534-23, Ichigaocho, Aoba-ku, Yokohama-shi, Kanagawa (JP) 225-0024; Takaaki Ishigure, Kanagawa (JP); Hidenobu Murofushi, Kanagawa (JP); Yuji Watanabe, Kanagawa (JP); Tsuyoshi Onishi, Kanagawa (JP)

(73) Assignees: Asahi Glass Company, Limited, Tokyo (JP); Yasuhiro Koike, Yokohama (JP)

( * ) Notice: Subject to any disclaimer, the term of this patent is extended or adjusted under 35 U.S.C. 154(b) by 0 days.

(21) Appl. No.: 11/075,441

(22) Filed: Mar. 9, 2005

(65) Prior Publication Data

US 2005/0207714 A1  Sep. 22, 2005

Related U.S. Application Data

(63) Continuation of application No. PCT/JP03/11645, filed on Sep. 11, 2003.

(30) Foreign Application Priority Data

Sep. 12, 2002 (JP) ............................. 2002-266209

(51) Int. Cl.
 *G02B 6/028* (2006.01)
(52) U.S. Cl. .................. 385/124; 385/143; 385/145
(58) Field of Classification Search ............... 385/124, 385/143, 145
See application file for complete search history.

(56) References Cited

U.S. PATENT DOCUMENTS

| 5,123,076 A | * | 6/1992 | Nishimoto et al. ......... 385/124 |
| 6,166,125 A |   | 12/2000 | Sugiyama et al. .......... 524/462 |
| 6,757,468 B1 | * | 6/2004 | Bickham et al. ............ 385/127 |
| 2004/0008958 A1 | * | 1/2004 | Bickham ..................... 385/124 |

FOREIGN PATENT DOCUMENTS

| EP | 866 348 | 9/1998 |
| JP | 8-114714 | 5/1996 |
| JP | 10-260322 | 9/1998 |
| JP | 11-167030 | 6/1999 |
| JP | 2000-319393 | * 11/2000 |
| JP | 2001-124939 | * 5/2001 |

* cited by examiner

*Primary Examiner*—John D. Lee
(74) *Attorney, Agent, or Firm*—Oblon, Spivak, McClelland, Maier & Neustadt, P.C.

(57) ABSTRACT

A plastic optical fiber low in attenuation in a high order mode and small in mode dispersion, is presented. The plastic optical fiber comprises at least a core and a clad surrounding the core, characterized in that the core has a refractive index which gradually decreases from the core center towards the outside in the radial direction of the plastic optical fiber, and the refractive index of the clad is lower than the refractive index of the core center and higher than the refractive index of the core periphery.

13 Claims, 6 Drawing Sheets

Cross section of optical fiber

PLASTIC OPTICAL FIBER

TECHNICAL FIELD

The present invention relates to a plastic optical fiber for communication, particularly to an improvement in the information transmission performance of a multimode optical fiber.

BACKGROUND ART

To meet the increase in the volume of information and telecommunications in recent years, in the trunk line system of Japan, laying of a silica single mode fiber network and total digitalization have already been completed. The silica single mode optical fiber is an ideal transmission medium which is low in attenuation and which is capable of transmitting optical signals over a long distance. However, in order to make higher speed communication possible, the diameter of the core region is designed to be from about 5 to 10 µm. Further, there has been a practical problem such that it is extremely weak against bending due to inflexibility of silica, unless the diameter is made small.

In order to make it possible for optical signals to enter into, be connected to or be branched from such a small core region, a very high level of alignment technique is required. Accordingly, in order to construct all by the silica single mode fiber, an enormous cost will be required, and such construction has not yet been extended to a domestic household level.

On the other hand, a polymer optical fiber (hereinafter referred to simply as POF) is such that the base material constituting the fiber is made of a polymer, and thus the cost for the material is low, and as compared with the silica fiber, it is possible to enlarge the diameter (200 to 1,000 µm). Further, even such a large diameter fiber is strong against bending and has excellent characteristics, due to the flexibility of the polymer material. Thus, with POF, a large diameter is possible, whereby injection, connection or branching of optical signals has become very easy.

A graded index (referred to simply as GI) type POF as a result of the research in the past, is a plastic optical fiber made of a polymethyl methacrylate (referred to simply as PMMA), wherein the refractive index gradually decreases from the core center towards the outside in the radial direction of the plastic optical fiber, and the refractive index of the clad is lower than the refractive index at the core center (e.g. JP-A-6-186441, JP-A-6-186442, JP-A-7-27928). With this GI type POF, as shown in FIG. 1, the output waveform after transmission for 100 m has substantially the same shape (the waveform shown by the solid line in FIG. 1) of the input waveform, although it is a waveform having a slight broadening of the arrival time by the influence of the difference in mode. Thus, GI type POF has a small mode dispersion and as compared with conventional SI type (step index type) POF, is epoch-making such that it is possible to improve the communication speed by at least two digids.

Further, taking connection to silica fiber as the trunk line fiber into consideration in an attempt to minimize the attenuation of POF at a wavelength of 1.55 µm at which the attenuation of the silica fiber becomes minimum, POF having hydrogen atoms in the polymer molecule replaced by deuterium atoms heavier than the hydrogen atoms or by fluorine atoms, was prepared (e.g. JP-A-10-268146, JP-A-10-293215). As a result, the absorption wavelength was shifted to the long wavelength side, and the attenuation at the wavelength of 1.55 µm was lowered, and thus it was made possible to obtain POF having a very low attenuation over a wide range of from the visible light region to the near infrared region.

However, as a result of an attempt to improve the transparency by using such a material, a problem of a high order mode dispersion which used to be hidden behind, with the conventional PMMA optical fiber, was surfaced. Specifically, as shown in FIG. 1, in the output waveform, delay in the output which appears to be attributable to an influence of the high order mode, became distinct (the waveform shown by white circles in FIG. 1). Thus, with a fluorine type optical fiber or the like, while it was possible to lower the attenuation by the attempt to improve the transparency, a new problem came up such that the communication speed was remarkably deteriorated.

Therefore, it was strongly desired to develop a technology to minimize the delay time in the high order mode transmission to increase the communication speed, while maintaining the low attenuation.

The present invention is intended to solve the problem in the prior art and to accomplish the following object. Namely, it is an object of the present invention to provide a plastic optical fiber which is low in attenuation in a high order mode and small in mode dispersion.

DISCLOSURE OF THE INVENTION

As a result of an extensive research in view of the above object, the present inventors have found it possible to accomplish the object of the present invention by the following constructions.

(1) A plastic optical fiber comprising at least a core and a clad surrounding the core, characterized in that the core has a refractive index which gradually decreases from the core center towards the outside in the radial direction of the plastic optical fiber, and the refractive index of the clad is lower than the refractive index of the core center and higher than the refractive index of the core periphery.

(2) The plastic optical fiber according to the above (1), which has an intermediate portion between the core periphery and the clad, wherein the refractive index of the intermediate portion is lower than the refractive index of the clad.

(3) The plastic optical fiber according to the above (1) or (2), wherein the core contains a non-polymerizable compound capable of forming a refractive index distribution by its concentration gradient.

(4) The plastic optical fiber according to the above (1), (2) or (3), wherein the core and the clad, respectively and independently, contain at least one polymer selected from the group consisting of an acrylic polymer, a polystyrene, a polynorbornene, a polycarbonate, a polyimide and a polyester.

(5) The plastic optical fiber according to the above (3) or (4), wherein the non-polymerizable compound is at least one compound selected from the group consisting of diphenyl sulfide, benzyl benzoate, triphenyl phosphate, dibutyl phthalate and tricresyl phosphate.

(6) The plastic optical fiber according to the above (1), (2) or (3), wherein the core and the clad, respectively and independently, contain a fluoropolymer having substantially no hydrogen atom.

(7) The plastic optical fiber according to the above (3) or (6), wherein the non-polymerizable compound is a fluorinated polycyclic compound which has at least three carbon rings or heterocyclic rings and which has substantially no hydrogen atom.

(8) The plastic optical fiber according to the above (3) or (6), wherein the non-polymerizable compound is a chlorotrifluoroethylene oligomer.

MEANINGS OF REFERENCE SYMBOLS a: core center, b: core, c: intermediate portion, d: clad, $r_0$: core center, $r_1$: boundary point between the core and the intermediate portion, $r_2$: boundary point between the intermediate portion and the clad, 410: drawing apparatus, 412: drawing furnace, 414: outer diameter monitor, 416: winding device, 420: cover, 422: furnace core tube, 424: heater, 426: preform, 427: neckdown portion, 428: upper cylinder, 429: arrow, 430: ring, 432: lower cylinder, 434: shutter, 438: plastic optical fiber

BEST MODE FOR CARRYING OUT THE INVENTION

Figure 1:
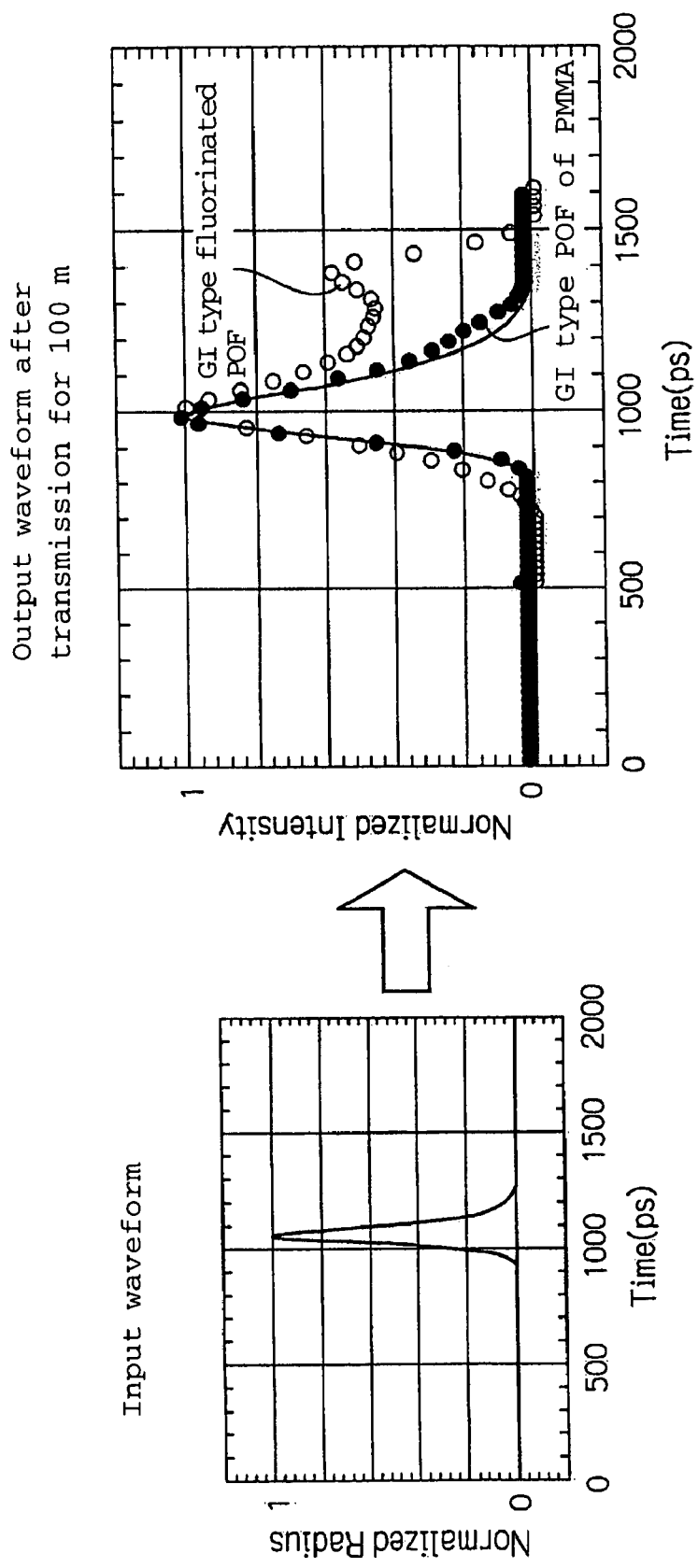
FIG. 1 is graphs showing the input waveform and the output waveform after transmission for 100 m.
Figure 2:
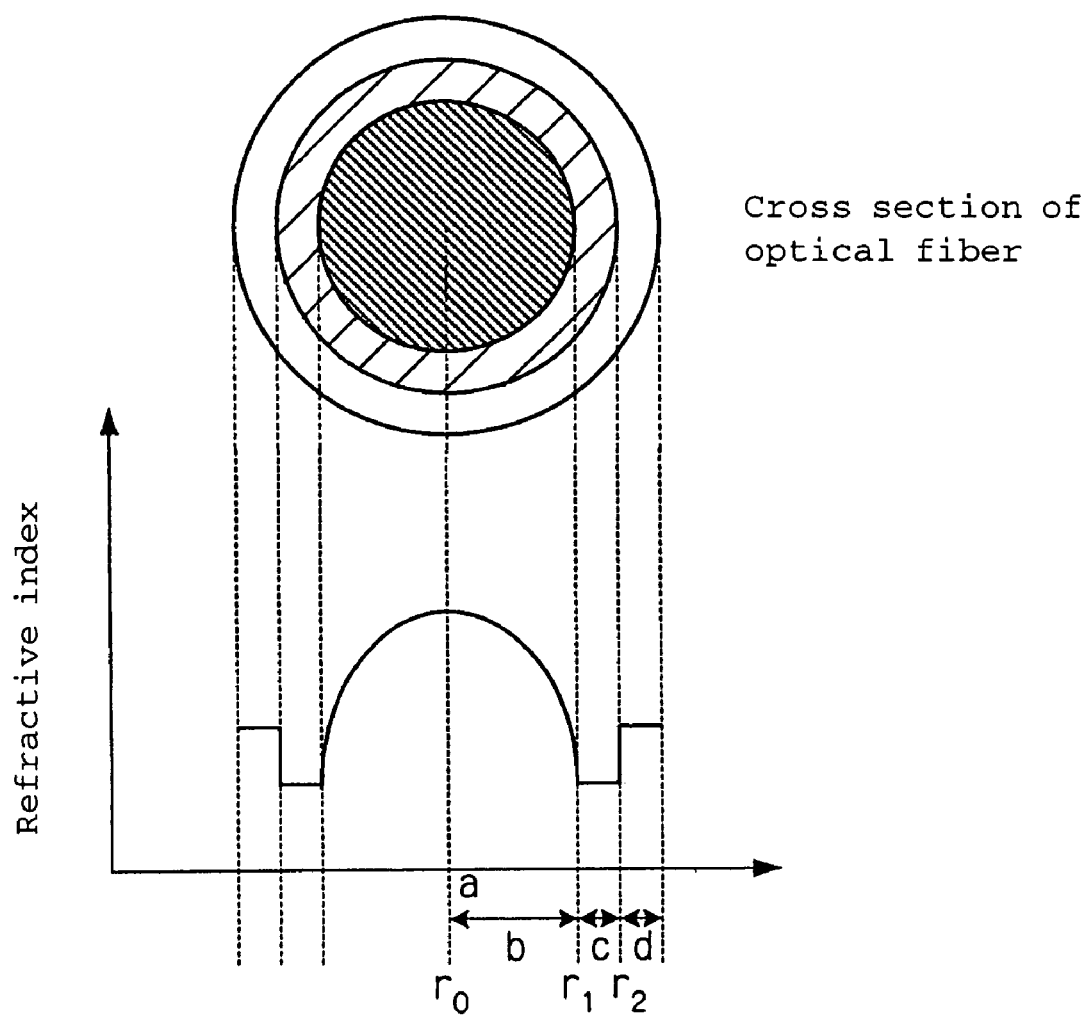
FIG. 2 shows a cross section of W type POF and the refractive index distribution.

As shown by the refractive index distribution in FIG. 2, the plastic optical fiber of the present invention is a plastic optical fiber wherein the refractive index of the core gradually decreases from the core center towards the outside in the radial direction, and the refractive index of the clad is lower than the core center, and it is characterized in that between the core and the clad, a portion having a refractive index lower than the clad, is provided. By designing such a plastic optical fiber having a W type refractive index distribution, the problem about the high order mode has been solved.

Here, the core center in the present invention means a portion where the refractive index in the radial direction is highest in the interior of the optical fiber, and in FIG. 2, a is the core center.

The core in the present invention is a portion having a refractive index distribution such that the refractive index gradually decreases from the above-mentioned core center ($r_0$) towards the outside in the radial direction. In FIG. 2, b is the core.

The core periphery in the present invention is the outermost portion of the core, and in FIG. 2, it is represented by $r_1$.

The intermediate portion in the present invention is a portion which is located between the core and the clad and which has a refractive index lower than the refractive index of the core. Usually, the refractive index of the intermediate portion is equal to the refractive index of the core periphery. However, a plastic different from the plastic constituting the matrix of the core may be used, or even if the matrix plastic is the same, for example, by changing the amount of an additive (non-polymerizable compound) to change the refractive index, a material different from the core periphery may be employed. In such a case, the refractive index of the intermediate portion may be made higher or lower than the refractive index of the core periphery. However, even in such a case, the refractive index of the intermediate portion must be lower than the refractive index of the clad. The intermediate portion may not be present, but it is preferred that the intermediate portion is present. In FIG. 2, c is the intermediate portion.

The clad in the present invention is a portion which is located outside the core (or outside the intermediate portion in a case where the intermediate portion is present) and which covers the intermediate portion and the core portion being a light transmitting region at the center of the fiber. The refractive index of the clad is lower than the refractive index of the core center and higher than the refractive index of the intermediate portion. In FIG. 2, d is the clad. The refractive index of the clad may be uniform or non-uniform.

Figure 4:
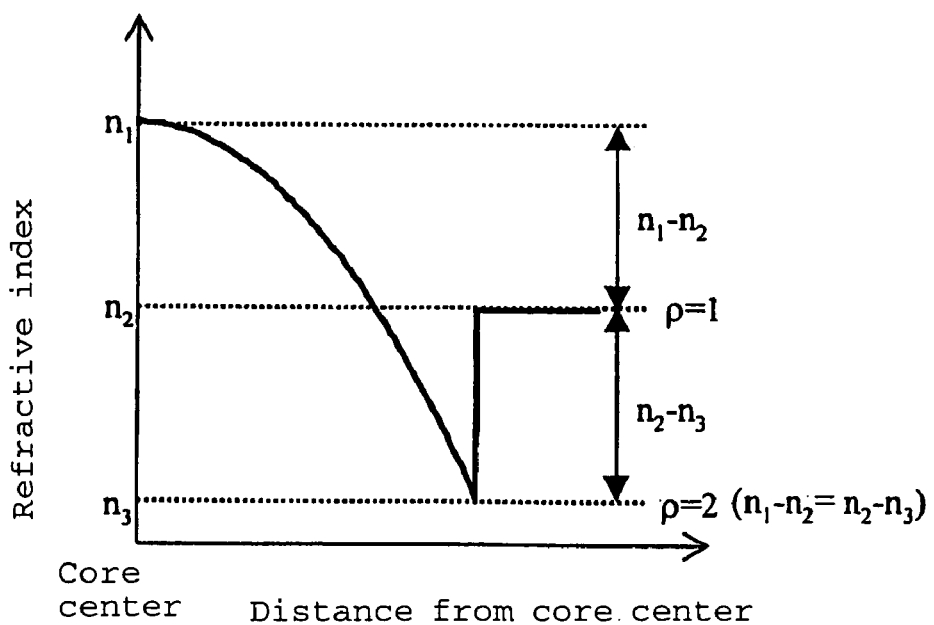
FIG. 4 is a graph showing the refractive index distribution curve when parameter ρ in the formula (1) is changed.

Here, the state where the refractive index of the optical fiber is being changed with a certain minimum value, will be referred to as a "valley". Irrespective of the presence or absence of the intermediate portion, this valley is present (an optical fiber having such a refractive index distribution is referred to as W type POF). The shape of the valley of the refractive index distribution is not particularly limited. It may be as shown in FIG. 2 wherein the refractive index takes a certain constant value in the vicinity of the minimum value so that the valley has a bottom, or as shown in FIG. 4 wherein the refractive index turns to sharply increase after reaching the minimum value so that the valley has no substantial bottom. Preferably, the refractive index gradually changes, i.e. not abruptly changes discontinuously, from the core periphery (from the intermediate portion where the intermediate portion is present) towards the clad.

So long as the fiber is POF having such W type refractive index distribution, there is no other particular restrictions. More preferred is POF having a refractive index distribution curve represented by the following formula (1):

$$n(r) = n_1 \left[1 - 2\rho\Delta\left(\frac{r}{R}\right)^g\right]^{1/2} \quad 0 \le r \le R \quad \text{Formula (1)}$$

In the above formula (1), r represents the distance in the radial direction from the core center, n(r) represents the refractive index of the core or the intermediate portion at the position r, and $n_1$ represents the refractive index at the core center.

R represents the radius of the core. In FIG. 2, the distance from $r_0$ to $r_1$ is the radius of the core, and the distance from $r_0$ to $r_2$ is the radius of the intermediate portion. A real optical fiber is rather flattened than a cylinder in many cases, and R is represented by an average of the radius $d_{max}$ of the smallest circumscribed circle and the radius $d_{min}$ of the largest inscribed circle, of the core, as shown by the following formula:

$$R = (d_{max} + d_{min})/2$$

Figure 3:
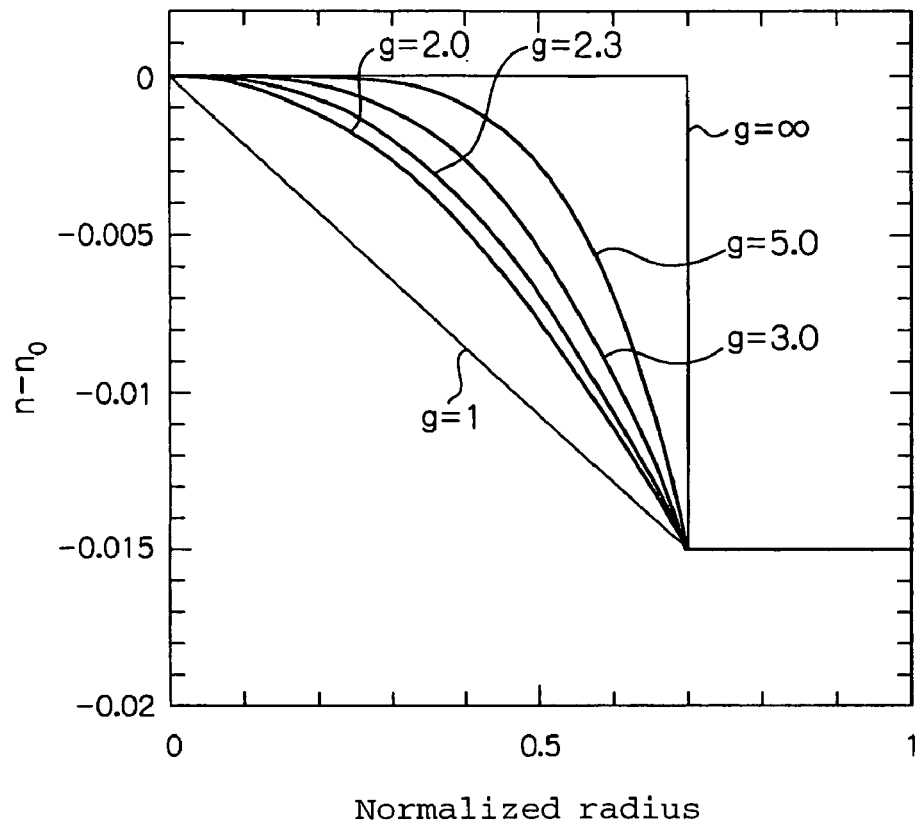
FIG. 3 is a graph showing the refractive index distribution curve when parameter g in the formula (1) representing the refractive index distribution curve, is changed.

Δ represents a relative refractive index difference, and $\Delta = (n_1 - n_2)/n_1$, where $n_2$ represents the refractive index of the clad.

g represents a refractive index distribution coefficient and is a parameter attributable to the shape of the refractive index curve of the core. When g=1, the refractive index at the core center drops linearly towards the refractive index at the outer diameter of the core (FIG. 3, provided that ρ which will be described hereinafter, is 1). As g becomes larger than 1, the curvature of the curve becomes large. In the present invention, a preferred value of g is from 1.0 to 5.0, more preferably from 1.8 to 3.0, most preferably 2.4.

ρ represents the refractive index coefficient of the intermediate portion as shown by the following formula:

$$\rho = (n_1 - n_3)/(n_1 - n_2)$$

When ρ=1, the fiber becomes GI type POF having no intermediate portion (valley), and when ρ=2, the difference $n_2 - n_3$ between the refractive index $n_2$ of the clad and the refractive index $n_3$ of the core periphery, becomes the same as the difference $n_1 - n_2$ between the refractive index $n_1$ of the core center and the refractive index $n_2$ of the clad (FIG. 4). In the present invention, a preferred value of ρ is larger than 1 and at most 2, more preferably from 1.2 to 1.8.

For POF having a refractive index curve in the present invention, the polymer to be used is not particularly limited so long as it is capable of providing the W type refractive index distribution. However, from the viewpoint of the glass transition temperature and low attenuation, it is preferred that it contains at least one polymer selected from the group consisting of an acrylic polymer, a polystyrene, a polynorbornene, a polycarbonate, a polyimide, a polyester and a fluoropolymer having substantially no hydrogen atom, and such a polymer is used as a matrix polymer. In the case of the acrylic polymer, it is preferred to use a polymer selected from a polymethacrylate, a polymethyl methacrylate, a methyl methacrylate/benzyl methacrylate copolymer, a polymethacrylate having hydrogen atoms entirely or partially substituted by deuterium atoms, a polymethyl methacrylate having hydrogen atoms entirely or partially substituted by deuterium atoms, a polymethacrylate having hydrogen atoms partially substituted by fluorine atoms, and a polymethyl methacrylate having hydrogen atoms partially substituted by fluorine atoms. The acrylic polymer having hydrogen atoms partially substituted by fluorine atoms, may, for example, be a polymer obtained by using, as a monomer, trifluoroethyl methacrylate (3FMA) or hexafluoroisopropyl fluoroacrylate (2FA-HFIP), as shown by the following formulae.

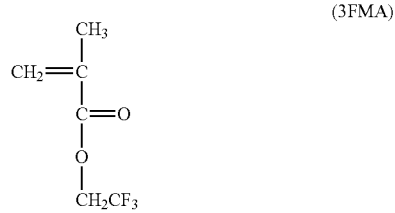

(3FMA)

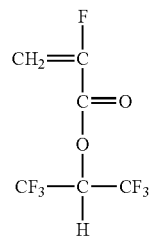

(2FA-HFIP)

A preferred weight average molecular weight (Mw) of such a polymer is from 40,000 to 200,000, more preferably from 60,000 to 100,000. If the molecular weight is too small, the heat resistance tends to be impaired, and if it is too large, it may sometimes be difficult to form an optical fiber having a refractive index distribution. The weight average molecular weight is a value obtained as calculated as styrene by gel permeation chromatography (GPC). Hereinafter, the average molecular weight is one obtained by this method.

In the case of the fluoropolymer, it is not particularly limited so long as it is an amorphous fluoropolymer having substantially no hydrogen atom. "Having substantially no hydrogen atom" means that if the presence of hydrogen atoms is only at the terminal groups, such is substantially the same as having no hydrogen atom, and it is unlikely that hydrogen atoms are present at portions constituting the repeating units. As the fluoropolymer having no hydrogen atom, a fluoropolymer having a cyclic structure is more preferred. The fluorocompound having a cyclic structure is preferably a fluorinated polycyclic compound which has at least three carbon rings or heterocyclic rings and which has substantially no hydrogen atom.

The fluoropolymer having a cyclic structure may be one having a cyclic structure in its main chain or one having a cyclic structure on its side chain. Either one may be used as the matrix polymer, but more preferred is a fluoropolymer having a cyclic structure in its main chain. As an example of one having a cyclic structure in its side chain, a polystyrene having hydrogen atoms substituted by fluorine atoms so that it has substantially no hydrogen atom, may, for example, be mentioned.

The fluoropolymer having a cyclic structure in its main chain is preferably a fluoropolymer having a fluorinated alicyclic structure, a fluorinated imide cyclic structure, a fluorinated triazine cyclic structure or a fluorinated aromatic cyclic structure. As the fluoropolymer having a fluorinated alicyclic structure, one having a fluorinated aliphatic ether cyclic structure is more preferred.

Specifically preferred as the polymer having a fluorinated alicyclic structure, are:

(1) a polymer obtained by polymerizing a monomer having a fluorinated cyclic structure (a monomer having a polymerizable double bond between a carbon atom constituting the ring and a carbon atom not constituting the ring, or a monomer having a polymerizable double bond between two carbon atoms constituting the ring), and (2) a polymer having a fluorinated alicyclic structure in its main chain, obtained by cyclopolymerization of a fluorinated monomer having at least two polymerizable double bonds.

The above homomer having a fluorinated alicyclic structure is preferably a monomer having one polymerizable double bond, and the above fluorinated monomer capable of cyclopolymerization is preferably a monomer having two polymerizable double bonds and having no fluorinated alicyclic structure.

Here, a copolymerizable monomer other than the monomer having a fluorinated alicyclic structure and the fluorinated monomer capable of cyclopolymerization, will be referred to as "other radical-polymerizable monomer".

Carbon atoms constituting the main chain of the fluoropolymer are constituted by two carbon atoms of the polymerizable double bond of the monomer. Accordingly, with a monomer having a fluorinated alicyclic structure having one polymerizable double bond, one or both of the two carbon atoms constituting the polymerizable double bond will be atoms constituting the alicyclic ring. With a fluorinated monomer having no alicyclic ring and having two polymerizable double bonds, one carbon atom of one polymerizable double bond will be bonded to one carbon atom of the other polymerizable double bond to form a ring. An alicyclic ring is formed by the two carbon atoms thus bonded and atoms present between them (excluding atoms in any side chain), and in a case where an etheric oxygen atom is present between the two polymerizable double bonds, a fluorinated aliphatic ether cyclic structure will be formed.

The polymer having a fluorinated alicyclic structure in its main chain, obtainable by polymerizing a monomer having a fluorinated alicyclic structure, is obtained by polymerizing a monomer having a fluorinated alicyclic structure, such as a perfluorodioxol having fluorine or a fluorinated alkyl group such as a trifluoromethyl group, a pentafluoroethyl group or a heptafluoropropyl group, on a dioxol ring member carbon, such as perfluoro(2,2-dimethyl-1,3-dioxol) (referred to simply as PDD), perfluoro(2-methyl-1,3-dioxol), perfluoro(2-ethyl-2-propyl-1,3-dioxol) or perfluoro(2,2-dimethyl-4-methyl-1,3-dioxol), perfluoro(4-methyl-2-methylene-1,3-dioxolane) (referred to simply as MMD) or perfluoro(2-methyl-1,4-dioxolane).

Further, a polymer having a fluorinated alicyclic structure in its main chain, obtained by copolymerizing such a monomer with another radical polymerizable monomer containing substantially no hydrogen atom, may also be employed. If the proportion of polymerized units of such another radical polymerizable monomer increases, the light transmittance of the fluoropolymer may sometimes decrease. Accordingly, as the fluoropolymer, a homopolymer of a monomer having a fluorinated alicyclic structure, or a copolymer wherein the proportion of polymerized units of such a monomer is at least 70 mol %, is preferred.

As such another radical polymerizable monomer containing substantially no hydrogen atom, tetrafluoroethylene, chlorotrifluoroethylene or perfluoro(methyl vinyl ether) may, for example, be mentioned.

As a commercially available amorphous fluoropolymer having substantially no hydrogen atom of such a type, the above-mentioned perfluoro(2,2-dimethyl-1,3-dioxol) type polymer (tradename: Teflon AF, manufactured by Du Pont Kabushiki Kaisha) or a perfluoro(4-methoxy-1,3-dioxol) type polymer (tradename: HYFLON AD, manufactured by Ausimont K.K.) may, for example, be mentioned.

Further, the polymer having a fluorinated alicyclic structure in its main chain, obtained by cyclopolymerization of a fluorinated monomer having at least two polymerizable double bonds, is known, for example, in JP-A-63-238111 or JP-A-63-238115. Namely, a polymer having a fluorinated alicyclic structure in its main chain will be obtained by cyclopolymerization of a monomer such as perfluoro(3-oxa-1,5-hexadiene) or perfluoro(3-oxa-1,6-heptadiene) (referred to simply as PBVE) or by copolymerizing such a monomer with another radical-polymerizable monomer containing no hydrogen atom, such as tetrafluoroethylene, chlorotrifluoroethylene or perfluoro(methyl vinyl ether). By the above-mentioned cyclopolymerization of PBVE, a polymerized unit having a 5-membered ring ether bond in its main chain, as represented by the above formula (I), will be formed by the bonding of carbon atoms at 2- and 6-positions.

Further, as the fluorinated monomer having at least two polymerizable double bonds, in addition to those described above, for example, a monomer having a substituent on a saturated carbon of PBVE is preferred. Specifically, perfluoro(4-methyl-3-oxa-1,6-heptadiene) (referred to simply as PBVE-4M), perfluoro(4-chloro-3-oxa-1,6-heptadiene) (referred to simply as PBVE-4Cl), perfluoro(5-methoxy-3-oxa-1,6-heptadiene) (referred to simply as PBVE-5MO) or perfluoro(5-methyl-3-oxa-1,6-heptadiene) may, for example, be preferred. If the proportion of polymerized units of such another radical-polymerizable monomer increases, the light transmittance of the fluoropolymer may sometimes decrease. Accordingly, the fluoropolymer is preferably a homopolymer of a fluorinated monomer having at least two polymerizable double bonds, or a copolymer wherein the proportion of polymerized units of such a monomer is at least 40 mol %.

As a commercial product of an amorphous fluoropolymer having substantially no hydrogen atom, of such a type, "CYTOP" (tradename, manufactured by Asahi Glass Company, Limited) may be mentioned.

Further, a fluoropolymer having a fluorinated alicyclic structure in its main chain may also be obtained by copolymerizing a monomer having a fluorinated alicyclic structure such as perfluoro(2,2-dimethyl-1,3-dioxol) with a fluorinated monomer having at least two polymerizable double bonds, such as perfluoro(3-oxa-1,5-hexadiene) or perfluoro (3-oxa-1,6-heptadiene) (PBVE). Also in such a case, depending upon the combination, the light transmittance may decrease, and accordingly, a copolymer is preferred wherein the proportion of polymerized units of the fluorinated monomer having at least two polymerizable double bonds, is at least 30 mol %.

As the polymer having a fluorinated alicyclic structure, a polymer having the cyclic structure in its main chain is preferred. One containing at least 20 mol %, preferably at least 40 mol %, of polymerized units having the cyclic structure, based on the total polymerized units, is preferred from the viewpoint of the transparency, mechanical properties, etc.

Further, the polymer having a fluorinated alicyclic structure is preferably a perfluoropolymer. Namely, it is preferably a polymer wherein all hydrogen atoms bonded to carbon atoms are substituted by fluorine atoms. However, part of fluorine atoms in the perfluoropolymer may be substituted by atoms other than hydrogen atoms, such as chlorine atoms or deuterium atoms. The presence of chlorine atoms is effective to increase the refractive index of the polymer.

The above-mentioned fluoropolymer having such a fluorinated alicyclic structure is particularly preferred for such a reason that as compared with a fluoropolymer having a fluorinated imide cyclic structure, a fluorinated triazine cyclic structure or a fluorinated aromatic cyclic structure which will be described hereinafter, even if it is fiberized by thermal stretching or melt spinning, the polymer molecules will be hardly aligned, thus scarcely causing light scattering. Particularly preferred is a fluoropolymer having a fluorinated aliphatic ether cyclic structure.

As the polymer having a fluorinated alicyclic structure, specifically one having repeating units selected from the following (I) to (V) may, for example, be mentioned. Here, fluorine atoms in such a polymer having a fluorinated alicyclic structure may partially be substituted by chlorine atoms in order to increase the refractive index. Further, the polymer may be a copolymer comprising at least two types of repeating units selected from the formulae (I) to (V).

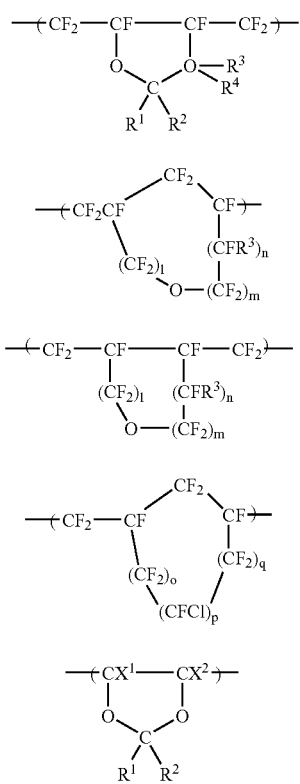

In the above formulae (I) to (V), l represents from 0 to 5, m represents from 0 to 4, n represents 0 or 1, provided that l+m+n is from 1 to 6, each of o, p and q which are independent of one another, is from 0 to 5, provided o+p+q is from 1 to 6, $R^1$ represents F or $CF_3$, and each of $R^1$ to $R^4$, $X^1$ and $X^2$, which are independent of one another, represents F, Cl, $CF_3$ or $OCF_3$.

The polymer having a fluorinated alicyclic structure is preferably a polymer having the cyclic structure in its main chain. It is particularly preferably one containing at least 20 mol %, preferably at least 40 mol %, of polymerized units having the cyclic structure, from the viewpoint of the transparency, mechanical properties, etc.

The above-mentioned fluoropolymer having a fluorinated alicyclic structure in its main chain is one of preferred matrix polymers in the present invention. However, as mentioned above, the matrix polymer is not limited thereto. For example, as the fluoropolymer, a fluoropolymer having a fluorinated imide cyclic structure in its main chain may also be preferably employed. Specifically, one having repeating units represented by the following formula may, for example, be mentioned.

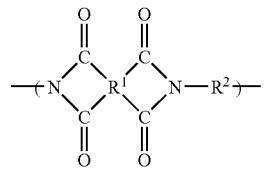

In the above formula, $R^1$ is selected from the following:

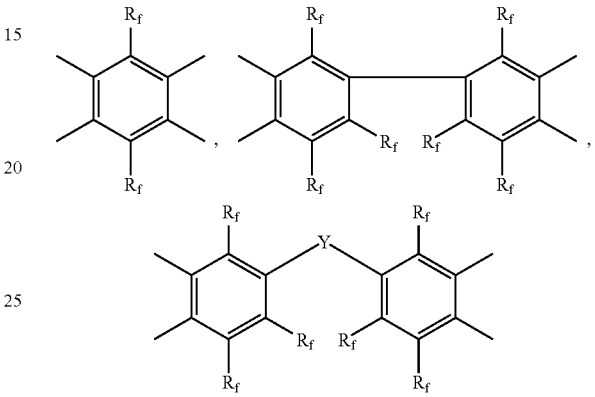

$R^2$ is selected from the following:

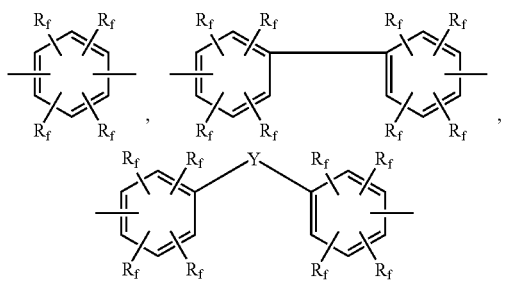

Here, $R_f$ is selected from a fluorine atom, a perfluoroalkyl group, a perfluoroaryl group, a perfluoroalkoxy group and a perfluorophenoxy group, and they may be the same or different from one another. Y is selected from the following:

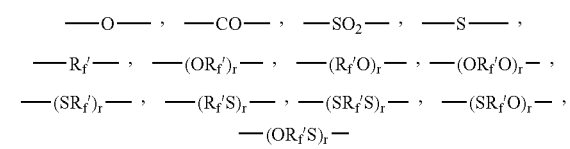

Here, $R_f'$ is selected from a perfluoroalkyl group and a perfluoroaryl group, and they may be the same or different from one another, and r is from 1 to 10. Y and two $R_f$ may form a ring via carbon, and in such a case, the ring may be a saturated ring or an unsaturated ring.

Further, in the present invention, the fluoropolymer having a fluorinated aromatic cyclic structure may be a fluorinated product of a polymer having an aromatic ring in its side chain or in its main chain, such as a polystyrene, a polycarbonate or a polyester. Such a product may be a completely fluorinated perfluoro compound or may be one having the rest of fluorine substituents substituted by chlorine or the like. Further, it may have a trifluoromethane substituent or the like.

Further, fluorine atoms in the above fluoropolymer may partially be substituted by chlorine atoms in order to increase the refractive index. Further, a substance to increase the refractive index may be incorporated to the fluoropolymer.

The fluoropolymer preferably has an adequate molecular weight so that the optical transmitter will exhibit heat resistance and will scarcely be softened even when exposed to a high temperature, and accordingly the optical transmission performance will not deteriorate. The molecular weight of the fluoropolymer to provide such characteristics has a melt moldable level as the upper limit, but it is usually preferably at a level of from 0.1 to 1 dl/g, more preferably at a level of from 0.2 to 0.5 dl/g, as represented by the intrinsic viscosity [η] measured at 30° C. in perfluoro (butyltetrahydrofuran) (PBTHF). Here, the number average molecular weight corresponding to such an intrinsic viscosity is usually at a level of from $1\times10^4$ to $5\times10^6$, preferably at a level of from $5\times10^4$ to $1\times10^6$.

Further, in order to secure moldability at the time of melt spinning of the fluoropolymer or at the time of stretching treatment of a preform, the melt viscosity of the fluoropolymer when the fluoropolymer is melted at a temperature of from 200 to 300° C., is preferably at a level of from $1\times10^2$ to $1\times10^5$ Pa·s.

Now, preferred combinations of polymers constituting the core, the intermediate portion and the clad will be described, but the present invention is by no means limited thereto.

1) Combination 1

A plastic optical fiber comprising a core containing at least a polymethyl methacrylate, an intermediate portion containing at least a polymethyl methacrylate, and a clad containing at least a methyl methacrylate/benzyl methacrylate copolymer.

2) Combination 2

A plastic optical fiber comprising a core containing at least a polymethyl methacrylate having hydrogen atoms entirely substituted by deuterium atoms, an intermediate portion containing at least a polymethyl methacrylate having hydrogen atoms entirely substituted by deuterium atoms, and a clad containing a polymethyl methacrylate.

By deuterating hydrogen atoms as mentioned above, the attenuation will be reduced with light of from 0.6 to 0.9 μm to be used as the signal wavelength, and a better POF base material will be obtained.

3) Combination 3

A plastic optical fiber comprising a core containing at least a polymer having a fluorinated alicyclic structure selected from the above formulae (I) to (V), an intermediate portion containing at least a fluorinated alicyclic structure selected from the above formulae (I) to (V) and having a refractive index lower than the core, and a clad containing a fluorinated alicyclic structure selected from the above formulae (I) to (V) and having a refractive index lower than the core center and higher than the intermediate portion.

By the incorporation of the fluorinated alicyclic structure selected from the above formulae (I) to (V), as described above, the attenuation can be reduced with light of from 0.5 to 1.55 μm to be used as a signal wavelength, and a better POF base material may be obtained, just like the above-mentioned case of being deuterated.

It is preferred to employ the above-described polymers as matrix. However, the matrix polymers for the core, the intermediate portion and the clad may be respectively different polymers or may be the same polymer. In the case of W type POF, however, the refractive indices of the core, the intermediate portion and the clad are different, and therefore, when the same polymer is to be used, it is necessary to add a compound to change the refractive index (such as a non-polymerizable compound which will be described hereinafter) or to use it as a copolymer made of two or more monomers as starting materials.

The non-polymerizable compound is at least one substance having a difference of at least 0.001 in refractive index as compared with the matrix polymer, and it may have a refractive index higher or lower than the matrix polymer. Usually, a substance having a refractive index higher than the matrix polymer, is used. Further, the non-polymerizable compound is preferably a compound having no reactivity to the polymer. One type of such a non-polymerizable compound may be used alone, or two or more different types may be used in combination.

Especially, in the optical fiber of the present invention, the core has a refractive index distribution which gradually lowers from the core center towards the outside in the radial direction. In order to form such a refractive index distribution, it is preferred to employ a method of diffusing a non-polymerizable compound to form a concentration gradient thereby to form a refractive index distribution.

For the purpose of adjusting the refractive index, it is possible to incorporate a non-polymerizable compound not only to the core but also to the clad or the intermediate portion.

In a case where the matrix polymer is at least one polymer selected from the group consisting of an acrylic polymer, a polystyrene, a polynorbornene, a polycarbonate, a polyimide, a polyester, a polycarbonate and a polyester, the non-polymerizable compound is preferably at least one compound selected from diphenyl sulfide, benzyl benzoate, diphenyl sulfoxide, triphenyl phosphate, dibutyl phthalate and tricresyl phosphate. Particularly preferred is diphenyl sulfide. As the concentration of such a non-polymerizable compound increases, the refractive index will also increase.

In a case where the matrix polymer is a fluoropolymer having substantially no hydrogen atom, the non-polymerizable compound is preferably a low molecular weight compound, an oligomer or a polymer containing an aromatic ring such as a benzene ring, a halogen atom such as chlorine, bromine or iodine, or a bond group such as an ether bond. Further, the non-polymerizable compound is preferably a substance having substantially no hydrogen atom. The difference in the refractive index from the matrix polymer is preferably at least 0.005.

The non-polymerizable compound being an oligomer or a polymer, is preferably made of a polymer of a monomer to form a fluoropolymer as described above, and preferably has a difference of at least 0.001 in the refractive index as compared with the matrix polymer. As a combination of such a non-polymerizable compound with a matrix polymer, it is, for example, possible to employ two types of fluoropolymers having different refractive indices, so that one of the fluoropolymers is used as the non-polymerizable compound.

Such a non-polymerizable compound preferably has a difference of at most 7 $(cal/cm^3)^{1/2}$ in the solubility parameter as compared with the above matrix. Here, the solubility parameter is a characteristic value which may be an index for mixability between substances, and it is represented by the formula $\delta=(E/V)^{1/2}$, where $\delta$ is the solubility parameter, E is the molecular agglomeration energy of a substance, and V is a molecular volume.

The non-polymerizable compound being a low molecular weight compound, may, for example, be a halogenated aromatic hydrocarbon containing no hydrogen atom bonded to carbon atoms. Particularly preferred is a halogenated aromatic hydrocarbon containing only fluorine atoms as the halogen atoms, or a halogenated aromatic hydrocarbon containing fluorine atoms and other halogen atoms, from the viewpoint of the compatibility with the fluoropolymer. Further, such a halogenated aromatic hydrocarbon more preferably does not have a functional group such as a carbonyl group or a cyano group.

Such a halogenated aromatic hydrocarbon may, for example, be a compound represented by the formula $\Phi r$-$Z_b$ ($\Phi r$ is a b-valent fluorinated aromatic ring residue having all hydrogen atoms substituted by fluorine atoms, Z is a halogen atom other than fluorine, —Rf, —CO—Rf, —O—Rf or —CN, wherein Rf is a perfluoroalkyl group, a polyfluoroperhaloalkyl group or a monovalent $\Phi r$, and b is 0 or an integer of at least 1). As the aromatic ring, a benzene ring or a naphthalene ring may be mentioned. The carbon number of the perfluoroalkyl group or the polyfluoroperhaloalkyl group for Rf is preferably at most 5. As the halogen atom other than fluorine, a chlorine atom or a bromine atom is preferred.

As a specific compound, 1,3-dibromotetrafluorobenzene, 1,4-dibromotetrafluorobenzene, 2-bromotetrafluorobenzotrifluoride, chloropentafluorobenzene, bromopentafluorobenzene, iodopentafluorobenzene, decafluorobenzophenone, perfluoroacetophenone, perfluorobiphenyl, chloroheptafluoronaphthalene or bromoheptafluoronaphthalene, may, for example, be mentioned.

As the non-polymerizable compound being a polymer or an oligomer, among those having repeating units of the above formulae (I) to (V), a fluoropolymer having a refractive index which is different from the fluoropolymer to be combined (such as a combination of a fluoropolymer containing only fluorine atoms as the halogen atoms with a fluoropolymer containing fluorine atoms and chlorine atoms, a combination of two fluoropolymers obtained by polymerizing at least two monomers of different types or having different proportions) is preferred.

Further, in addition to the above-described fluoropolymer having a cyclic structure in its main chain, an oligomer made of a monomer containing no hydrogen atom, such as tetrafluoroethylene, chlorotrifluoroethylene, dichlorodifluoroethylene, hexafluoropropylene or a perfluoroalkyl vinyl ether, or a copolymer oligomer of at least two types of such monomers, may also be used as the non-polymerizable compound. Further, a perfluoropolyether having structural units of —$CF_2CF(CF_3)O$— or —$(CF_2)_nO$— (n is an integer of from 1 to 3) may, for example, be also used. The molecular weight of such an oligomer is selected within an amorphous molecular weight range. The number average molecular weight is preferably from 300 to 10,000. From the viewpoint of the diffusion efficiency, the number average molecular weight is more preferably from 300 to 5,000.

As one type among particularly preferred non-polymerizable compounds, a fluoropolymer, particularly a chlorotrifluoroethylene oligomer, may be mentioned, since the compatibility with a fluoropolymer having a cyclic structure in its main chain, is excellent. As the compatibility is good, the fluoropolymer, particularly the fluoropolymer having a cyclic structure in its main chain, and a chlorotrifluoroethylene oligomer, can easily be mixed by heat melting at a temperature of from 200 to 300° C. Further, it is possible to uniformly mix the two by dissolving and mixing them in a fluorinated solvent, followed by removing the solvent. A preferred molecular weight of the chlorotrifluoroethylene oligomer is from 500 to 1,500 by number average molecular weight.

Further, as a particularly preferred non-polymerizable compound, at least one fluorinated polycyclic compound (B) selected from the group consisting of the following (B1) to (B3) may be mentioned.

(B1) A fluorinated non-condensed polycyclic compound having at least two fluorinated rings which are carbon rings or heterocyclic rings and which have fluorine atoms or perfluoroalkyl groups, bonded by a bond containing at least one member selected from the group consisting of a triazine ring, an oxygen atom, a sulfur atom, a phosphorus atom and a metal atom, and having substantially no hydrogen atom.

(B2) A fluorinated non-condensed polycyclic compound having at least three fluorinated rings which are carbon rings or heterocyclic rings and which have fluorine atoms or perfluoroalkyl groups, bonded directly or by a bond containing a carbon atom, and having substantially no hydrogen atom.

(B3) A fluorinated condensed polycyclic compound which is a polycondensed polycyclic compound constituted by at least three carbon rings or heterocyclic rings and which has substantially no hydrogen atom.

The above fluorinated polycyclic compounds are compounds having substantially no C—H bond (i.e. carbon-hydrogen bond) which causes light absorption of near infrared light. Such a fluorinated polycyclic compound is preferably a perfluoro compound having a structure in which all hydrogen atoms in the compound are substituted by fluorine atoms or perfluoroalkyl groups. Unless the purpose of the present invention is impaired, part of fluorine atoms in such a perfluoro compound may be substituted by one or two chlorine atoms or bromine atoms. The number average molecular weight of the fluorinated polycyclic compound (B) is preferably from $3\times10^2$ to $2\times10^3$, more preferably from $3\times10^2$ to $10\times10^3$. With a view to increasing the solubility with the amorphous fluoropolymer having substantially no hydrogen, as a matrix polymer, the fluorinated polycyclic compound (B) preferably has a perfluoroalkyl group, and with a view to increasing the difference in refractive index from the matrix polymer, the fluorinated polycyclic compound (B) preferably does not have a perfluoroalkyl group.

The fluorinated polycyclic compound (B) is preferably made of carbon rings or heterocyclic rings having fluorine atoms or perfluoroalkyl groups. Such carbon rings and heterocyclic rings are preferably selected from those of at least 4-membered rings, preferably from 4 to 6-membered rings. The atoms constituting the heterocyclic ring are preferably selected from carbon atoms, nitrogen atoms, oxygen atoms, sulfur atoms and phosphorus atoms. As the perfluoroalkyl group, a $C_{1-20}$ perfluoroalkyl group is preferred.

The carbon ring may, for example, be an aromatic hydrocarbon ring such as a benzene ring or a ring having one or two hydrogen atoms in a benzene ring substituted by methyl groups; or a cyclic unsaturated hydrocarbon ring other than the aromatic hydrocarbon ring, such as a cyclopentene ring or a cyclohexene ring. The heterocyclic ring may, for example, be a heterocyclic ring having one type of a hetero atom, such as a thiophene ring, a furan ring, a pyridine ring, a triazine ring or a triazole ring, or a heterocyclic ring having two types of hetero atoms, such as an isothiazole ring. A preferred fluorinated ring is a fluorinated aromatic hydrocarbon ring, and a more preferred fluorinated ring is a perfluoroaromatic hydrocarbon ring. As the aromatic hydrocarbon ring, a benzene ring is preferred.

The fluorinated polycyclic compound (B) is a compound wherein two or more fluorinated rings are bonded without sharing two or more atoms. "Bonded without sharing two or more atoms" means that the fluorinated rings are bonded by sharing one atom, or the fluorinated rings are directly or indirectly bonded. "The fluorinated rings are indirectly bonded" means that the fluorinated rings are bonded via at least one atom.

In a case where two fluorinated rings are bonded, such a bond is a bond containing at least one member selected from the group consisting of a triazine ring, an oxygen atom, a sulfur atom, a phosphorus atom and a metal atom. In a case where three or more fluorinated rings are bonded, such a bond is a bond containing at least one member selected from the group consisting of a triazine ring, an oxygen atom, a sulfur atom, a phosphorus atom and a metal atom, a direct bond of the three or more fluorinated rings, or a bond containing a carbon atom.

The metal atom is preferably a 2- to 4-valent metal atom selected from Zn, Sn, Pb, Ge, Si, Ti, Hg, Tl, As, Se, Te and Cd. A more preferred metal atom is a Sn atom, since it presents a fluorinated non-condensed polycyclic compound having good thermal stability and chemical stability.

As the fluorinated non-condensed polycyclic compound having two or more fluorinated rings bonded by a bond containing a triazine ring, a fluorinated aromatic triazine compound represented by any one of the following formulae 1 to 3 is preferred. In this specification, $\Phi g$ (g is an integer of from 1 to 6) represents a residue having g fluorine atoms removed from perfluorobenzene. In a case where some fluorine atoms remain after the removal of g fluorine atoms, the structure may be such that part or all of such fluorine atoms may be substituted by a perfluoroalkyl group.

As the fluorinated non-condensed polycyclic compound having two or more fluorinated rings bonded by a bond containing a phosphorus atom, a compound represented by $(\Phi 1)_3$-P, or a compound bonded by a bond containing a phosphasatriene ring represented by the formula 4, is preferred.

As the fluorinated non-condensed polycyclic compound having two or more fluorinated rings bonded by a bond containing a sulfur atom, a fluorinated aromatic sulfur-containing compound represented by the following formula 5 or 6, is preferred. Here, in the formula 5, h is an integer of from 1 to 4, and in the formula 6, k is an integer of from 1 to 6.

As the fluorinated non-condensed polycyclic compound having two or more fluorinated rings bonded by a bond containing a metal atom, a fluorinated aromatic metal-containing compound represented by the following formula 7 or 8, is preferred. Here, in the formulae 7 and 8, M is a metal atom selected from Zn, Sn, Pb, Ge, Si, Ti, Hg, Tl, As, Se, Te and Cd, and each of p and q is the valence of metal M and an integer of from 2 to 4.

As the fluorinated non-condensed polycyclic compound having three or more fluorinated rings bonded directly or by a bond containing carbon, a fluorinated aromatic compound represented by any one of the following formulae 9 to 12 is preferred. With a view to not impairing the transparency of the refractive index distribution type optical resin material, the total number of $\Phi 1$ to $\Phi 4$ in the fluorinated aromatic compound is preferably from 3 to 5.

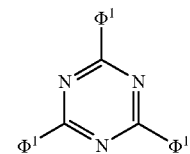

Formula 1

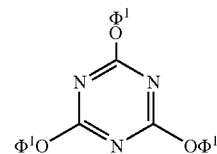

Formula 2

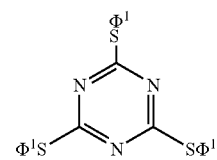

Formula 3

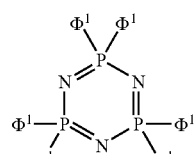

Formula 4

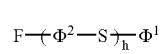

Formula 5

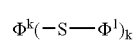

Formula 6

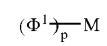

Formula 7

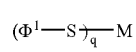

Formula 8

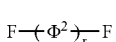

Formula 9

(r is an integer of from 3 to 7)

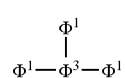

Formula 10

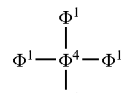

Formula 11

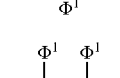

Formula 12

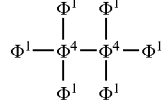

As carbon rings and heterocyclic rings in a fluorinated condensed polycyclic compound which is a condensed polycyclic compound constituted by at least three carbon rings or heterocyclic rings and wherein part or all of hydrogen atoms are substituted by fluorine atoms or fluorinated groups, at least 4-membered rings are preferred, and from 4- to 6-membered rings are more preferred. Preferred atoms constituting the heterocyclic rings are selected from e.g. carbon atoms, nitrogen atoms, oxygen atoms, sulfur atoms and phosphorus atoms.

The fluorinated condensed polycyclic compound is preferably a fluorinated condensed polycyclic hydrocarbon constituted by 3 or 4 carbon rings, such as perfluorofluorene, perfluorophenarene, perfluorophenanthrene, perfluoroanthracene, perfluorotriphenylene, perfluoropyrene, perfluorochrysene or perfluoronaphthacene, or a fluorinated condensed polycyclic compound represented by the following formula 13 or 14.

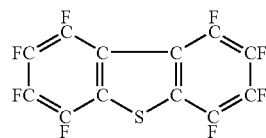

Formula 13

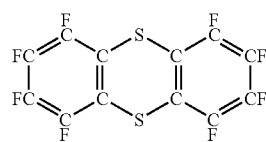

Formula 14

With a view to not impairing the transparency of POF, a fluorinated condensed polycyclic hydrocarbon constituted by three carbon rings, such as perfluorofluorene, perfluorophenarene, perfluorophenanthrene or perfluoroanthracene, is more preferred.

It is preferred to select the fluorinated polycyclic compound (B) from those having high thermal stability and solubility with the matrix polymer and those which do not impair the transparency of the refractive index distribution type optical resin materials. As such a fluorinated polycyclic compound (B), a fluorinated non-condensed polycyclic compound having at least two fluorinated rings bonded by a bond containing at least a triazine ring, is particularly preferred. The triazine ring may, for example, be a 1,2,3-triazine ring, a 1,2,4-triazine ring or a 1,3,5-triazine ring, and the 1,3,5-triazine ring is preferred.

The amount of the non-polymerizable compound varies depending upon the types of the matrix polymer and the non-polymerizable compound. However, if the amount of the non-polymerizable compound is too much, there will be a problem with respect to heat resistance as the low molecular weight substance is present too much. Accordingly, it is preferably at least 5 mass % and at most 20 mass %, to the matrix polymer of the core having a refractive index which gradually decreases.

Now, a preferred method for producing a preform of W type POF in the present invention will be described. However, it should be understood that the present invention is by no means restricted thereto.

1) Interfacial Gel Polymerization

In interfacial gel polymerization, a hollow cylindrical container is employed for the production of a fiber preform, and polymerization is carried out by applying heat or light from the exterior of a hollow tube, whereby a gel layer will be formed at the internal periphery of the hollow tube at the initial stage of the polymerization. At that time, the above-mentioned non-polymerizable compound tends to be hardly incorporated in the gel layer at the internal periphery of the hollow tube, since its molecular size is larger than the monomer. Consequently, the concentration of the non-polymerizable compound increases towards the center where the polymerization reaction has not yet been proceeded, and thus a refractive index distribution will be formed.

The interfacial gel polymerization is employed in the case of forming a core having a refractive index which gradually decreases from the core center towards the outside in the radial direction, and a method for producing the clad and the intermediate portion other than the core, is not thereby limited. However, a production method having at least the following steps a to c, is preferred.

a) A step of injecting a material for plastic to form the clad into a hollow cylindrical container (such as a glass tube) and polymerizing it under rotation to form a hollow cylindrical body of clad, b) a step of injecting a material for plastic to form the intermediate portion into the hollow cylindrical body of clad, and polymerizing it under rotation to form a hollow cylindrical body of intermediate portion inside the cylindrical body of clad, and c) a step of injecting a material for plastic to form the core into the hollow cylindrical body of intermediate portion and polymerizing it to form the core.

The material for plastic to form the clad in step a may contain the above-mentioned non-polymer compound, a polymerization initiator and a chain transfer agent in addition to the above-mentioned monomer as the raw material for the matrix polymer. Further, the monomer as the raw material for the matrix polymer may be of a single type or may be a combination of two or more types. When two or more monomers are incorporated, the product will be a copolymer.

For the polymerization reaction of the monomer to be used in the present invention, preferably, radical polymerization is employed wherein a peroxide having a O—O bond, an azo compound, or the like is used as a polymerization initiator. As such a polymerization initiator, a so-called intermediate temperature initiator which effectively generates radicals at a temperature of from about 40° C. to about 130° C., such as benzoyl peroxide, lauroyl peroxide or t-butyl peroxide, may preferably be used. The temperature condition for the polymerization reaction in the case where this intermediate temperature initiator is used, is preferably from about 40° C. to about 120° C. It is necessary to adjust the polymerization reaction rate so as to avoid formation of cracks in the polymer after the reaction or during the polymerization reaction, due to expansion or shrinkage by the reaction heat or the reaction itself or to avoid boiling of the monomer during the reaction by the reaction heat, and such adjustment can be made by a combination of the polymerization temperature and the amount of the initiator. The amount of the initiator may be at a level of from 0.001 to 10 wt %, preferably from 0.01 to 1.0 wt %, to the monomer at a temperature of from about 40° C. to about 120° C.

Polymerization by such a heat energy is carried out by heating from the exterior of the hollow cylindrical container. Further, other than polymerization by a heat energy, polymerization by means of a light energy, etc. may also be used. Also in such a case, the polymerization reaction rate can be adjusted likewise by a combination of the quantity of the input energy such as the temperature and the concentration.

The chain transfer agent is not particularly limited, and it may be optionally selected for use from known chain transfer agents. Such known chain transfer agents may, for example, be an aromatic hydrocarbon such as benzene or isopropyl benzene; a halide such as chloroform or carbon tetrachloride; a mercapto type compound (a compound having a —SH group) such as butyl mercaptan; and an alcohol such as methanol.

The hollow cylindrical container in step a, may be any container so long as it has such a shape, and ones made of various materials such as glass, may be used. However, as shown below, the polymerization is a radical reaction, and in order to prevent inclusion of oxygen from air which hinders the radical polymerization reaction, the hollow cylindrical container is preferably a container which can be sealed, or a container which can prevent inclusion of oxygen, such as a container having a nitrogen atmosphere.

For the rotation, the rotational speed is preferably at most 10,000 rpm, more preferably from 100 rpm to 5,000 rpm.

The material for plastic to form the intermediate portion in step b contains the above-mentioned monomer as the material for the matrix polymer and may contain a polymerization initiator, a non-polymerizable compound or a chain transfer agent in addition to the monomer. The monomer may be of a single type or a combination of two or more types. When two or more monomers are incorporated, the product will be a copolymer.

In the present invention, the intermediate portion is a portion where the refractive index is lowest in the interior of the fiber, and the monomer may contain an additive to lower the refractive index.

Also in step b, like in step a, the rotational speed is preferably at most 10,000 rpm, more preferably from 100 rpm to 5,000 rpm.

Further, the material for plastic to form the intermediate portion may be injected as it is into the hollow clad prepared in step a, followed by polymerization under rotation, or the material for plastic to form the intermediate portion may preliminarily be polymerized to such an extent that the viscosity becomes to be from about 1,000 cps to 7,000 cps, and the material thus preliminarily polymerized is injected into the hollow cylindrical body and further polymerized under the rotation to form the hollow cylindrical body of intermediate portion.

The material for plastic to form the core in step c comprises the above-mentioned monomer as the material for the matrix polymer and the non-polymerizable compound capable of forming the refractive index distribution by the concentration gradient, and it may contain a polymerization initiator, a non-polymer compound or a chain transfer agent in addition to the monomer. The monomer may be of a single type or a combination of two or more types. In a case where two or more monomers are incorporated, the product will be a copolymer.

Further, the material for plastic to form the core may be injected as it is into the hollow intermediate portion prepared in step a, followed by polymerization under rotation, or the material for plastic to form the core, may preliminarily be polymerized to such an extent that the viscosity becomes from about 1,000 cps to about 7,000 cps, and the material thus preliminarily polymerized, may be injected into the hollow cylindrical body and further polymerized under rotation, to form the core.

Step c may be carried out in one step, or may be repeated in at least two steps, to form the core. More preferably, the production is carried out by adjusting the refractive index in at least two steps to meet the formula (1) of the refractive index distribution. Adjustment of the refractive index can be carried out by changing the amount or the type of the non-polymerizable compound.

In the production of the core, it is not necessary to carry out the polymerization until the above-mentioned preferred molecular weight is reached at the core center, and the polymerization may be terminated halfway. However, it is preferred that the above-mentioned molecular weight is satisfied with the core as a whole.

In a preferred method for producing the POF preform, it is preferred to carry out steps a, b and c in this order to first form the peripheral portion of the POF preform and finally form the core located at the center portion. However, it is otherwise possible to carry out the polymerization from the center by heat or light and finally form the radially peripheral portion. In such a case, the non-polymerizable compound is a substance having a refractive index lower than the matrix polymer. By starting the polymerization from the center, a gel layer will firstly be formed at the radial center portion, and the non-polymerizable compound tends to hardly be incorporated in the gel layer. Accordingly, it is necessary to form a concentration gradient such that at the radial center portion, the concentration of the non-polymerizable compound is low, and at the radially peripheral portion, the concentration of the non-polymerizable compound becomes high.

2) DD Method

In the DD method, firstly, the monomer material containing no non-polymerizable compound, is polymerized to prepare a cylindrical body having a hollow center portion. To the hollow center portion, the non-polymerizable compound is injected, and the prepared cylindrical body is melted under rotation. The non-polymerizable compound will diffuse from the inside radially towards the outside, whereby the concentration gradient of the non-polymerizable compound will be formed in the radial direction. Thus, POF preform having a refractive index distribution will be formed. Injection of the non-polymerizable compound is not limited to a case of injecting only a single layer of the non-polymerizable compound at the center portion, but the non-polymerizable compound may be injected in multilayers at the center portion.

In the case of preparing W type POF by the DD method, any method may be employed so long as it comprises steps of (1) preliminarily carrying out polymerization to prepare a hollow cylindrical body, (2) injecting the non-polymerizable compound into the hollow portion, and (3) melting the cylindrical body. However, a production method having at least the following steps a to d is preferred.

a) A step of polymerizing a material for plastic to form the clad thereby to form a hollow cylindrical body of clad, b) a step of polymerizing a material for plastic to form the intermediate portion thereby to form a hollow intermediate portion, c) a step of injecting the non-polymerizable compound into the hollow portion of the above intermediate portion prepared in step b, and melting the intermediate portion to diffuse the non-polymerizable compound and to prepare a column which comprises a core made of a portion having a refractive index distribution formed by the concentration gradient of the non-polymerizable compound and having a refractive index higher than the clad, and an intermediate portion made of a portion having a refractive index lower than the clad, and d) a step of inserting the column prepared in step c) into the hollow portion of the clad prepared in step a, followed by heating to join them.

The method of preparing a POF preform by inserting a column (rod) preliminarily prepared in step c into the hollow cylindrical body prepared in step a, like step d, is a so-called rod-in-tube method. For the DD method for preparing W type POF of the present invention, the production method by such a rod-in-tube method is preferred.

Further, it is also possible to prepare a POF preform via the following steps after the above step a):

b2) a step of injecting a material for plastic to form the intermediate portion into the hollow cylindrical body of clad, and polymerizing the intermediate portion to form a hollow cylindrical body of intermediate portion inside of the cylindrical body of clad, and c2) a step of injecting the non-polymerizable compound into the hollow portion of the hollow intermediate portion, and melting the intermediate portion to form a column having a refractive index distribution formed by the concentration gradient of the non-polymerizable compound in the radial direction. However, in the case of this production method, it is necessary to consider the glass transition temperatures (Tg) of the clad and the intermediate portion, and Tg of the intermediate portion must be lower than Tg of the clad, to make the intermediate portion readily meltable and to induce the dispersion of the non-polymerizable compound. If Tg of the intermediate portion is higher than Tg of the clad, in the melting step, the clad and the intermediate portion will be mixed, whereby POF having a W type refractive index can hardly be obtained. If the matrix polymer is selected taking Tg into consideration, it is possible to prepare W type POF also by this method.

3) Dip Coating

A method of repeatedly dip coating a core material made of a matrix polymer obtained by e.g. melt spinning or stretching, with the non-polymerizable compound or a matrix polymer containing such a non-polymerizable compound.

4) Utilizing the Difference in Reactivity of Monomers

A method wherein two types of monomers which are a monomer to form a matrix polymer and a monomer to form a non-polymerizable compound and which are different in their reactivities, are used, and a polymerization reaction is proceeded so that the compositional ratio of repeating units of the matrix polymer to repeating units of the non-polymerizable compound continuously changes from the peripheral portion towards the center.

5) Removal by Evaporation/Elution

A method wherein a mixture obtained by uniformly mixing a matrix polymer and a non-polymerizable compound, or a mixture obtained by uniformly mixing them in a solvent, followed by evaporating and removing only the solvent, is fiberized by melt spinning or melt extrusion, which is then (or immediately after being fiberized) contacted with an inert gas in a heated state to evaporate the non-polymerizable compound from the surface thereby to form a refractive index distribution.

Or, a method wherein after the above-described fiberization, the fiber is dipped in a solvent which dissolves only the non-polymerizable compound without dissolving the matrix polymer, so that the non-polymerizable compound is eluted from the surface of the fiber to form a refractive index distribution.

6) Multilayer Extrusion

A high refractive index polymer and a low refractive index polymer are mixed in a heat-melted state or in a solution state containing a solvent, and they are mutually diffused while extruding (or after extruding) them in multilayers different in their mixed ratio, to finally obtain a fiber having a refractive index distribution formed. In this case, the high refractive index polymer may be a matrix polymer, and the low refractive index polymer may be a non-polymerizable compound.

Figure 5:
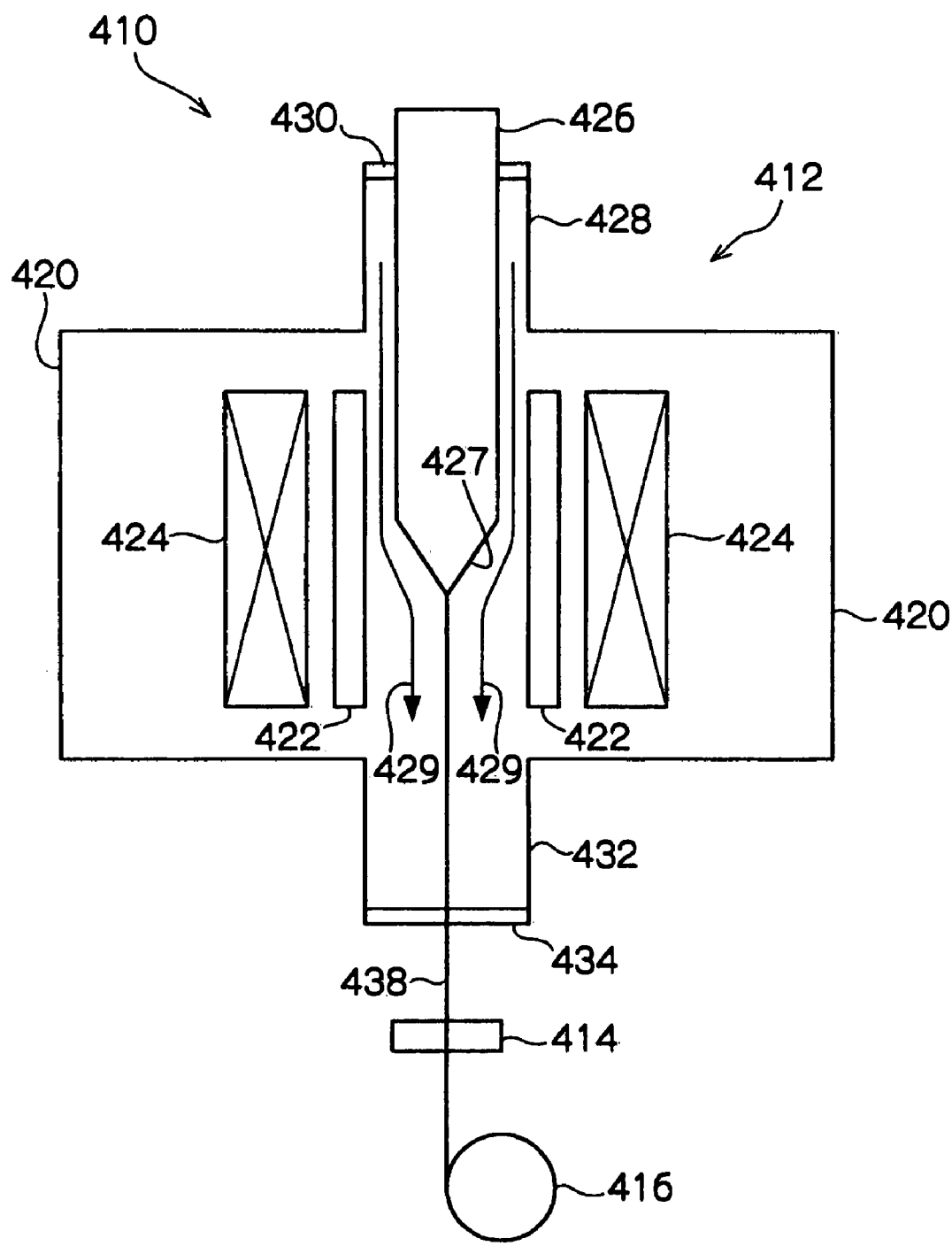
FIG. 5 is a vertical cross-sectional view of a drawing apparatus which is useful for drawing a plastic optical fiber preform prepared in accordance with the present invention.

The POF preform thus obtained is melt spun to obtain an optical fiber. The melt spinning method may be carried out by a commonly employed drawing apparatus without any particularly restriction. However, a schematic view of a drawing apparatus suitable for the present invention is shown in FIG. 5. The drawing apparatus 410 comprises a drawing furnace 412, an outer diameter monitor 414 and a winding device 416. The drawing furnace 412 has a housing comprising a metal cover 420, and an upper cylinder 428 and a lower cylinder 432 disposed at upper and lower portions of the cover 420, respectively. The drawing furnace 412 comprises such a housing, a cylindrical furnace core tube 422 disposed inside thereof and a heater 424 disposed outside of the furnace core tube 422.

In a case where the plastic optical fiber preform is to be drawn by means of the drawing apparatus 410 having the above-described construction, as shown in FIG. 5, the cylindrical plastic optical fiber preform 426 is inserted inside of the furnace core tube 422 and set in the drawing furnace 412. A drawn part (i.e. an optical fiber 438) of the preform is wound up by the winding device 416, whereby the optical fiber preform 426 will be disposed in the drawing furnace 412 with a neckdown portion 427 formed by winding up, directed downward.

The plastic optical fiber preform 426 is not usually completely surrounded by the cover 420 but a part thereof remains as protruded upward from the upper cylindrical 428. In order to maintain air tightness in the drawing furnace 412, the upper side of the upper cylinder 428 is sealed with a ring 430 having a hole of a size substantially equal to the outer diameter of the plastic optical fiber preform 426. On the other hand, at the lower side of the lower cylinder 432, a metal shutter 434 is provided, and in the vicinity of the center of the shutter 434, a small opening is provided, so that the drawn fiber can pass therethrough.

At the time of drawing, the plastic optical fiber preform 426 in the furnace core tube 422 is heated by a heater 424 surrounding the furnace core tube 422. An inert gas introduced to prevent oxidation of the surface of the heated plastic optical fiber preform 426, is supplied into the drawing furnace 412 through the ring 430 and flows down in the furnace core tube 422 as shown by the arrow 429. Thus, during heating for drawing, the preform 426 in the furnace core tube 422 is surrounded by the inert gas flow. The heated and melted preform 426 is spun at a predetermined speed to form a plastic optical fiber 438, which passes through the opening of the above shutter 434 and through the outer diameter monitor 414, whereby the outer diameter is measured, and then wound up by the winding device 416.

The plastic optical fiber thus prepared can be used for a cable.

EXAMPLES

Now, the present invention will be described in further detail with reference to Examples and Comparative Examples.

Example 1

Preparation of W Type POF-1

Into a glass tube having a length of 500 mm and an inner diameter of 22 mm, 99 g of methyl methacrylate (referred to simply as MMA), 11 g of benzyl methacrylate (referred to simply as Bz-MMA), 470 µl of t-butylperoxy-2-ethyl hexanoate and 360 µl of n-butyl mercaptan were filled. After sealing the upper end, the tube was held horizontal and heated at 70° C. for 4 hours while rotating it at 300 rpm, whereupon the rotation was stopped and polymerization was carried out under heating at 90° C. for 20 hours, to obtain a cylindrical container made of a methyl methacrylate/benzyl methacrylate copolymer.

One end of this container made of the methyl methacrylate/benzyl methacrylate copolymer, was sealed, and 60 g of MMA, 300 μl of t-butylperoxy-2-ethyl hexanoate and 240 μl of butyl mercaptan were filled. After sealing the upper end, the container was held horizontal and heated at 70° C. for 4 hours while rotating it at 3,000 rpm, whereupon the rotation was stopped, and polymerization was carried out under heating at 90° C. for 20 hours to obtain a hollow body having a polymethyl methacrylate (referred to simply as PMMA) layer inside of the methyl methacrylate/benzyl methacrylate copolymer.

Further, into the inside of this hollow body, 60 g of methyl methacrylate, 7.416 g of a non-polymerizable compound diphenyl sulfide (referred to simply as DPS), 12 μl of di-t-butyl peroxide and 196 μl of n-lauryl mercaptan were filled. After sealing the end, the filled hollow body was heated at 90° C. for 24 hours, and then, polymerization was further carried out under heating at 110° C. for 48 hours, to obtain a rod having an outer diameter of 22 mm.

This rod was vertically mounted on a rod feed apparatus and then melt spun by drawing and winding up at a constant speed while heating and melting it in a cylindrical heating furnace at 220° C., to obtain an optical fiber having a diameter of 0.75 mm.

Figure 6:
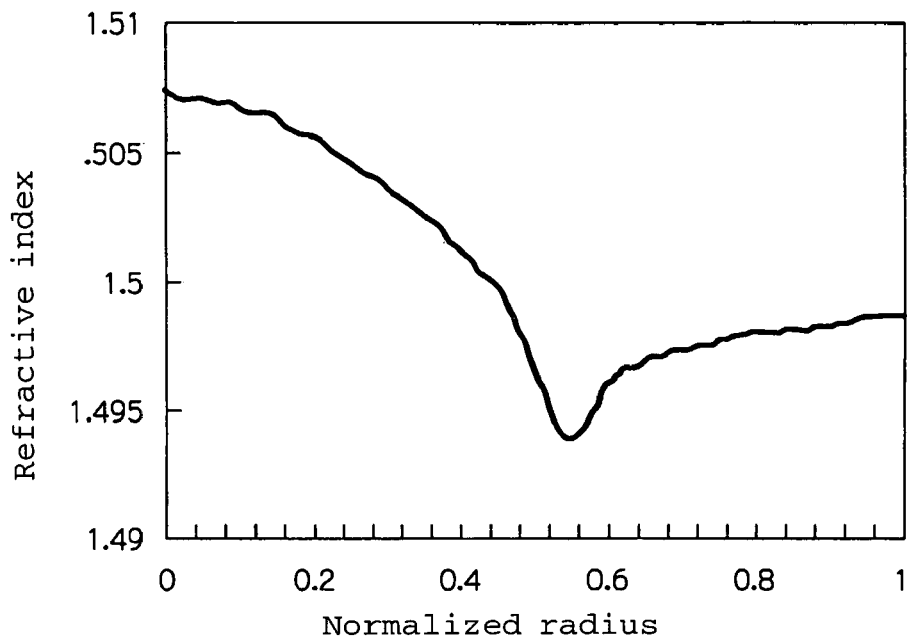
FIG. 6 is a graph showing the refractive index distribution of W type POF prepared in an Example, which has an intermediate portion and the matrix polymer of which is PMMA.

The refractive index distribution on the fiber cross section of the obtained optical fiber was measured, whereby as shown in FIG. 6, the fiber was W type POF wherein the refractive index gradually decreased from the center portion to the outer peripheral direction, then the refractive index increased from the minimum refractive index and further at the outer side, became substantially constant at a refractive index lower than the core center. This refractive index curve agreed very well with the above formula (1), whereby $g=2.2$, and $\rho=2$.

The transmission characteristics of the obtained optical fiber for a length of 100 m were evaluated, whereby the attenuation was 150 dB/km at a wavelength of 650 nm, and the bandwidth was 2.12 GHz, and thus the fiber had good performance equal to GI type POF having no valley.

Preparation of W Type POF-2

Into a glass tube having a length of 500 mm and an inner diameter of 22 mm, 110 g of MMA, 470 μl of t-butylperoxy-2-ethyl hexanoate and 360 μl of n-butyl mercaptan were filled. After sealing the upper end, the tube was held horizontal and heated at 70° C. for 4 hours while rotating it at 3,000 rpm, whereupon the rotation was stopped and polymerization was carried out under heating at 90° C. for 20 hours, to obtain a cylindrical container made of PMMA.

One end of this container made of PMMA was sealed, and 60 g of deuterated methyl methacrylate (referred to simply as MMA(d8)) having hydrogen atoms of methyl methacrylate substituted by deuterated atoms, 300 μl of t-butylperoxy-2-ethyl hexanoate and 240 μl of butyl mercaptan were filled. After sealing the upper end, the filled container was held horizontal and heated at 70° C. for 4 hours while rotating it at 3,000 rpm, whereupon the rotation was stopped, and polymerization was carried out under heating at 90° C. for 20 hours to obtain a hollow body having a deuterated polymethyl methacrylate layer inside of the cylindrical container of PMMA.

Further, into the inside of this hollow body, 60 g of MMA (d8), 7.416 g of DPS, 12 μl of di-t-butyl peroxide and 196 μl of n-lauryl mercaptan were filled. After sealing the end, the filled hollow body was heated at 90° C. for 24 hours, and then, polymerization was further carried out under heating at 110° C. for 48 hours, to obtain a rod having an outer diameter of 22 mm.

This rod was vertically mounted on a rod feed apparatus and then melt spun by drawing and winding up at a constant speed while heating and melting it in a cylindrical heating furnace at 220° C., to obtain an optical fiber having a diameter of 0.75 mm.

The refractive index distribution on the fiber cross section of the obtained optical fiber was measured, whereby like W type POF-1, the fiber was W type POF. This refractive index curve agreed very well with the above formula (1), and $g=2.4$, and $\rho=1.5$.

The transmission characteristics of the obtained optical fiber for a length of 100 m were evaluated, whereby the attenuation was 85 dB/km at a wavelength of 650 nm, and the bandwidth was 2.38 GHz, and it was a fiber having an attenuation smaller than W type POF-1.

Preparation of GI Type POF-1 having no Valley

Into a glass tube having a length of 500 mm and an inner diameter of 22 mm, 170 g of MMA, 770 μl of t-butylperoxy-2-ethyl hexanoate and 600 μl of n-butyl mercaptan were filled. After sealing the upper end, the glass tube was held horizontal and heated at 70° C. for 4 hours while rotating it at 3,000 rpm, whereupon the rotation was stopped and polymerization was carried out under heating at 90° C. for 20 hours, to obtain a cylindrical container made of PMMA.

One end of this container made of PMMA was sealed, and 60 g of MMA, 7.416 g of DPS, 12 μl of di-t-butyl peroxide and 196 μl of n-lauryl mercaptan were filled. After sealing the end, the container was heated at 90° C. for 24 hours, and then, polymerization was further cried out under heating at 110° C. for 48 hours to obtain a rod having an outer diameter of 22 mm.

This rod was vertically mounted on a rod feed apparatus and melt-spun by drawing and winding up at a constant speed while heating and melting it in a cylindrical heating furnace at 220° C. to obtain an optical fiber having a diameter of 0.75 mm.

Figure 7:
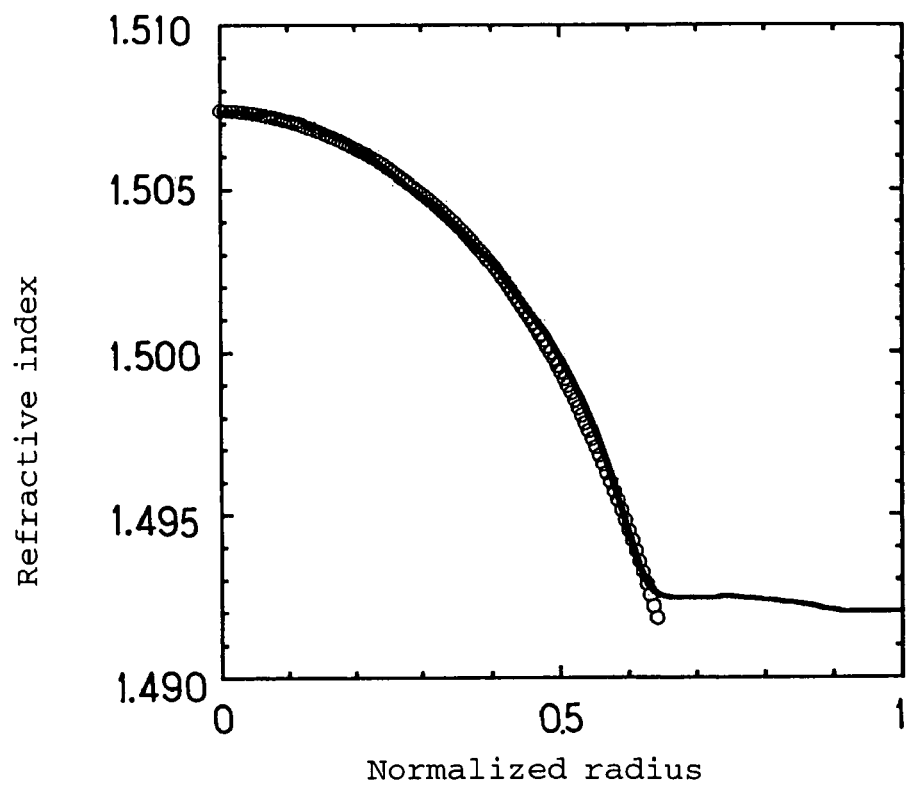
FIG. 7 is a graph showing the refractive index distribution of GI type POF prepared in an Example, which does not have an intermediate portion and the matrix polymer of which is PMMA.

The refractive index distribution on the fiber cross section of the obtained optical fiber was measured, whereby as shown in FIG. 7, it was GI type POF wherein the refractive index gradually decreased from the center portion towards the outer peripheral direction and at the outer side, the refractive index was substantially constant.

The transmission characteristics of the obtained optical fiber for a length of 100 m were evaluated, whereby the attenuation was 150 dB/km at a wavelength of 650 nm, and the bandwidth was 1.8 GHz.

Preparation of GI Type POF-2 having no Valley

Into a glass tube having a length of 500 mm and an inner diameter of 22 mm, 170 g of MMA (d8), 770 μl of t-butylperoxy-2-ethyl hexanoate and 600 μl of n-butyl mercaptan were filled. After sealing the upper end, the glass tube was held horizontal and heated at 70° C. for 4 hours while rotating it at 300 rpm, whereupon the rotation was stopped and polymerization was carried out under heating at 90° C. for 20 hours, to obtain a cylindrical container made of polymethyl methacrylate.

One end of this container made of PMMA was sealed, and 60 g of MMA (d8), 7.416 g of DPS, 12 μl of di-t-butyl peroxide and 196 μl of n-lauryl mercaptan were filled. After sealing the end, the filled container was held horizontal and heated at 95° C. for 24 hours while rotating it at 10 rpm, whereupon the rotation was stopped, and polymerization was cried out under heating at 110° C. for 48 hours to obtain a rod having an outer diameter of 22 mm.

This rod was vertically mounted on a rod feed apparatus and melt-spun by drawing and winding up at a constant speed while heating and melting it in a cylindrical heating furnace at 220° C. to obtain an optical fiber having a diameter of 0.75 mm.

Like in the case of GI type POF-1, it was GI type POF wherein the refractive index gradually decreased from the center portion towards the outer peripheral direction, and at the outer side thereof, the refractive index was substantially constant.

The transmission characteristics of the obtained optical fiber for a length of 100 m were evaluated, whereby the attenuation was 80 dB/km at a wavelength of 650 nm, and the bandwidth was 1.8 GHz.

Evaluation

1. Measurement of Mode Dependent Loss

Multi-mode incident lights were introduced into W type POF-1 and 2 and GI type POF-1 having no valley, obtained as described above, and attenuation of each mode after transmission for 100 m was measured. The mode dependent loss was measured by introducing a laser beam into GI type POF via a silica single mode fiber to excite a certain limited mode group in the GI type POF and measuring the fiber length dependency of the output beam intensity by a cutback method. By optionally displacing the input beam position by the single mode fiber from the center of the GI type POF towards the periphery, from the low order to high order mode groups were separately excited, and the attenuation for every mode was calculated.

Figure 8:
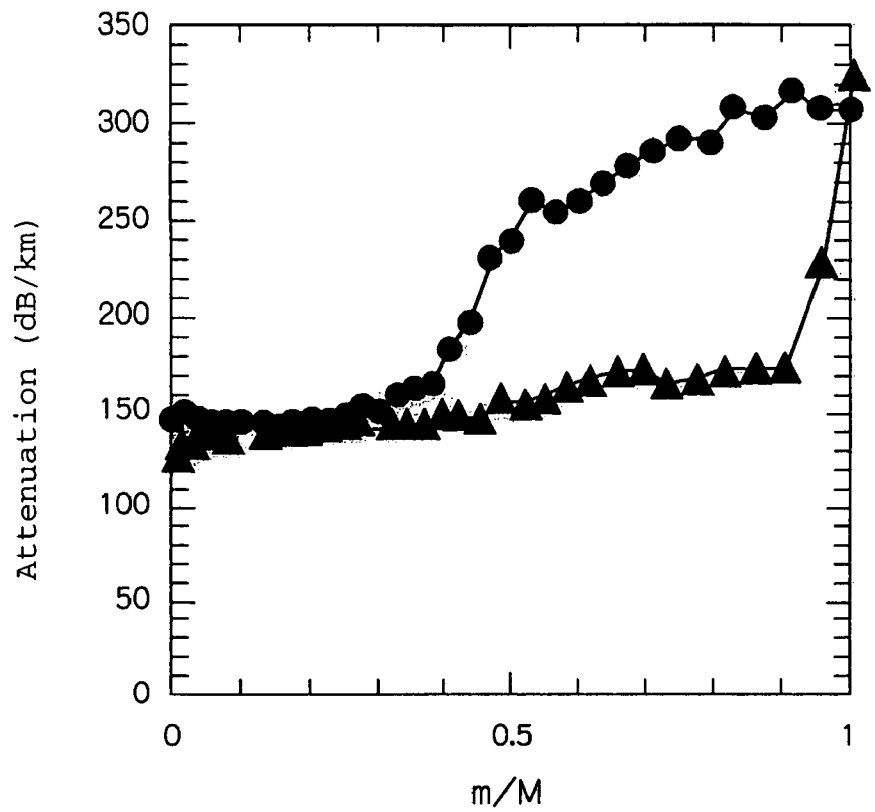
FIG. 8 is a graph showing the mode dependent loss of POF, of which the matrix polymer is PMMA.

With respect to POF of PMMA type, comparison between W type POF-1 having a valley and GI type POF-1 having no valley, is shown in FIG. 8. In FIG. 8, the abscissa for m/M indicates the mode order to the total mode number. 0 in the abscissa represents 0 order mode, and 1 in the abscissa represents the maximum order mode. In FIG. 8, one plotted with triangular dots is the result by W type POF-1, and one plotted with round dots is the result by GI type POF-1.

FIG. 8 shows the results that as compared with GI type POF, W type POF having a valley has a very small attenuation in a high order mode.

2. Measurement of Mode Dependent Delay Time

With respect to the W type POF-2 and GI type POF-2 having no valley, obtained as described above, the respective mode groups were separately excited, and the arrival time of each mode after transmission of 100 m was measured, whereby the arrival delay time relative to the 0 order mode was measured. The measurement was carried out by a differential mode delay (DMD) method. DMD is one whereby when a pulse-modulated laser beam is to be entered into POF, it is entered via a silica single mode fiber to excite a certain limited mode group of POF, and on the basis of the output waveform, the delay time of such a mode group is measured by changing the exciting position by the single mode fiber.

Figure 9:
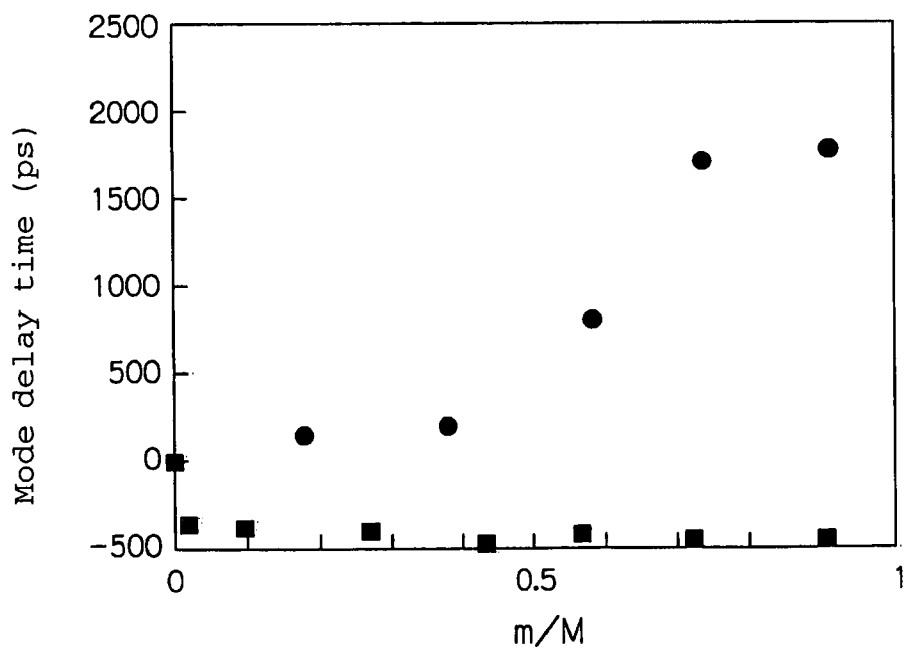
FIG. 9 is a graph showing the result of measurement of the mode dependent delay time.

In FIG. 9, the ordinate represents the delay time in arrival of each mode, on the basis that the time of arrival of the 0 order mode is set to be 0. The abscissa represents the mode order m/M to the total mode number, like in FIG. 8. Further, the plotted in FIG. 9 are results by the following samples.

Square dots: W type POF-2

Round dots: GI type POF-2

As shown in FIG. 9, as compared with GI type POF-2 having no valley, W type POF-2 having a valley had a small delay in a high order mode and thus was an optical fiber less susceptible to an influence of the mode difference.

Example 2

20 g of perfluoro(3-oxa-1,6-heptadiene) (referred to simply as PBVE), 20 g of perfluoro(4-methyl-3-oxa-1,6-heptadiene) (referred to simply as PBVE-4M) and 500 ml of $(CH_3)_2CHOCOO)_2$ as a polymerization initiator, were charged into a glass tube, freeze-deaerated and then polymerized under rotation at a high speed. A hollow tube thus prepared was taken out from the glass tube to obtain a tube made of a polymer having a number average molecular weight of about $1\times10^5$. Into the hollow portion of this tube, 10 g of PBVE-4M and 100 ml of $(CH_3)_2CHOCOO)_2$ as a polymerization initiator, were added, and after sealing, polymerized under rotation at a low speed to obtain a hollow tube.

Further, into this hollow tube, 10 g of PBVE-4M, 1 g of a CTFE oligomer as a non-polymerizable compound and 100 ml of $((CH_3)_2CHOCOO)_2$ as a polymerization initiator, were added, and after sealing, polymerized.

CTFE oligomer

A POF preform thus prepared was melt-spun to obtain an optical fiber having a diameter of 0.75 mm. The refractive index distribution of this POF was a W type refractive index distribution wherein the refractive index of the clad was 1.335, the minimum refractive index at the intermediate portion was 1.328, and the refractive index of the core center was 1.342, and like in Example 1, it was a plastic optical fiber having a small light loss in a high order mode and little delay of light in a high order mode.

Example 3

525 g of PBVE, 225 g of perfluoro(4-chloro-3-oxa-1,6-heptadiene) (referred to simply as PBVE-4Cl), 4 kg of deionized water, 260 g of methanol and 3.7 g of $((CH_3)_2CHOCOO)_2$ were charged into a glass flask having an internal capacity of 5 L. The interior was substituted by nitrogen and then, suspension polymerization was carried out at 40° C. for 22 hours to obtain 690 g of a polymer having a number average molecular weight of about $5\times10^4$. This polymer was treated at 250° C. for 5 hours in an atmosphere of a fluorine/nitrogen mixed gas (fluorine gas concentration: 20 vol %) to obtain a polymer excellent in light transmittance and heat stability (hereinafter referred to as polymer A1).

Polymer A1 is charged into a sealed glass tube, and a cylindrical tube made solely of polymer A1 was prepared by melt molding. The refractive index of polymer A1 was 1.35.

On the other hand, in the same manner as in the preparation of polymer A1 except that use of PBVE and PBVE-4Cl was changed to 750 g of PBVE, polymer A2 was prepared.

Polymer A2 was charged into a sealed glass tube, and a cylindrical tube made solely of polymer A2 was prepared by melt molding. The refractive index of polymer A2 was 1.342.

Into a hollow portion of this cylindrical tube of polymer A2, 135-TPB was injected and melt-molded at 250° C. to obtain a columnar molded product (hereinafter referred to as molded product a). The refractive index of the molded product a was found as gradually decreased from the radial center portion towards the peripheral portion.

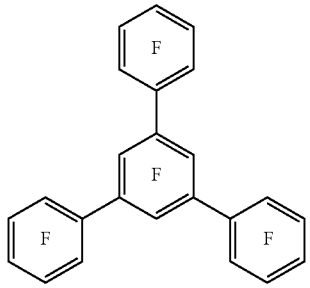

(135-TPB)

Into the hollow portion of the cylindrical body of polymer A1, the molded product a was inserted and integrated under heating at 200° C. to obtain a preform. This preform was melt-spun at 230° C. to obtain an optical fiber having a diameter of 0.75 mm. The refractive index distribution of this POF was a W type refractive index distribution wherein the refractive index of the clad was 1.35, the minimum refractive index at the intermediate portion was 1.342, and the refractive index at the core center was 1.358, and like in Example 1, the fiber was a plastic optical fiber having a small light loss in a high order mode and a small delay of light in a high order mode.

Example 4

A plastic optical fiber was prepared in the same manner as in Example 2 except that use of PBVE was changed to 3FMA, PBVE-4M was changed to 2FA-HFIP, and CTFE oligomer was changed to dibutyl phthalate.

The refractive index distribution of this POF was a W type refractive index distribution wherein the refractive index of the clad was 1.38, the minimum refractive index of the intermediate portion was 1.36, and the refractive index of the core center was 1.40, and like in Example 1, the fiber was a plastic optical fiber having a small light loss in a high order mode and a small delay of light in a high order mode.

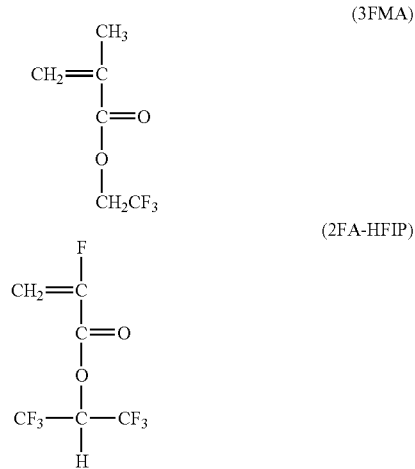

(3FMA)

(2FA-HFIP)

Example 5

In Example 3, use of PBVE and PBVE-4Cl as materials for polymer A1, was changed to 487.5 g of perfluoro(2,2-dimethyl-1,3-dioxol) (referred to simply as PDD) and 262.5 g of 1,1,2,2-tetrafluoroethylene (TFE). Further, use of PBVE as a material for the polymer A2, was changed to 637.5 g of PDD and 112.54 g of TFE. Except for these changes, a plastic optical fiber was prepared in the same manner as in Example 3.

The glass transition temperature (Tg) of polymer A1 at that time was 160° C., and Tg of polymer A2 was 240° C.

Further, the refractive index distribution of POF was a W type refractive index distribution wherein the refractive index of the clad was 1.31, the minimum refractive index of the intermediate portion was 1.29, and the refractive index of the core center was 1.35, and like in Example 1, the fiber was a plastic optical fiber having a small light loss in a high order mode and a small delay of light in a high order mode.

Example 6

Into a glass tube having a length of 500 mm and an inner diameter of 22 mm, 104.5 g of MMA, 5.5 g of DPS, 470 µl of t-butyl peroxy-2-ethylhexanoate and 380 µl of n-butylmercaptan were filled. After sealing the upper end, the glass tube was held horizontal and heated at 70° C. for 4 hours while rotating it at 3,000 rpm, whereupon the rotation was stopped, and polymerization was carried out under heating at 90° C. for 20 hours, to obtain a cylindrical container made of PMMA and DPA as a non-polymerizable compound.

One end of this container made of polymethyl methacrylate was sealed, and 60 g of MMA, 300 µl of t-butylperoxy-2-ethyl hexanoate and 240 µl of butylmercaptan were filled. After sealing the upper end, the container was held horizontal and heated at 70° C. for 4 hours while rotating it at 3,000 rpm, whereupon the rotation was stopped, and polymerization was carried out under heating at 90° C. for 20 hours to obtain a hollow body having a MMA layer inside of the cylindrical container made of PMMA and DPS.

Further, into the inside of this hollow body, 60 g of MMA, 7.416 g of DPS, 12 µl of di-t-butylperoxide and 196 µl of n-lauryl mercaptan were filled. After sealing the end, the filled hollow tube was heated at 95° C. for 24 hours, and then, polymerization was further carried out under heating at 110° C. for 48 hours to obtain a rod having an outer diameter of 22 mm.

This rod was vertically mounted on a rod feed apparatus and while heating and melting it in a cylindrical heating furnace of 220° C., melt-spun by drawing and winding it up at a constant speed to obtain an optical fiber having a diameter of 0.75 mm.

The refractive index distribution of this POF was a W type refractive index distribution wherein the refractive index of the clad was 1.50, and the minimum refractive index of the intermediate portion was 1.492, and the refractive index of the core center was 1.51, and like in Example 1, the fiber was a plastic optical fiber having a little light loss in a high order mode and a little delay of light in a high order mode.

Example 7

In Example 2, use of 20 g of PBVE and 20 g of PBVE-4M was changed to 37.6 g of PBVE-4M and 2.4 g of CTFE oligomer, to prepare a clad. Further, the preparation of the intermediate portion was carried out exactly in the same manner as in Example 2, and the preparation of the core was carried out exactly in the same manner as in Example 2 except that 10 g of PBVE-4M was changed to 9.3 g of PBVE-4M, and 1 g of CTFE oligomer was changed to 1.7 g, to obtain an optical fiber of 0.75 mm.

The refractive index distribution of this POF was a W type refractive index distribution wherein the refractive index of the clad was 1.34, the minimum refractive index of the intermediate portion was 1.328, and the refractive index of the core center was 1.355, and like in Example 1, the fiber was a plastic optical fiber having a small light loss in a high order mode and a small delay of light in a high order mode.

INDUSTRIAL APPLICABILITY

It is possible to provide a plastic optical fiber small in attenuation in a high order mode and small in mode dispersion.

The entire disclosure of Japanese Patent Application No. 2002-266209 filed on Sep. 12, 2002 including specification, claims, drawings and summary is incorporated herein by reference in its entirety.

What is claimed is:

1. A plastic optical fiber comprising at least a core and a clad surrounding the core, wherein the core has a refractive index which gradually decreases from the core center towards the outside in the radial direction of the plastic optical fiber, and the refractive index of the clad is lower than the refractive index of the core center and higher than the refractive index of the core periphery and wherein the plastic optical fiber has a refractive index distribution curve represented by the following formula (1):

$$n(r) = n_1 \left[1 - 2\rho\Delta\left(\frac{r}{R}\right)^g\right]^{1/2} \quad 0 \leq r \leq R \quad \text{Formula (1)}$$

where r is the distance in the radial direction from the core center;
n(r) is the refractive index of the core or an intermediate portion of the position r;
$n_1$ is the refractive index at the core center;
ρ is the refractive index coefficient of the intermediate portion of the plastic optical fiber;
Δ is a relative refractive index difference;
R is the radius of the core and
g is a refractive index distribution coefficient.

2. The plastic optical fiber according to claim 1, which has an intermediate portion between the core periphery and the clad, wherein the refractive index of the intermediate portion is lower than the refractive index of the clad.

3. The plastic optical fiber according to claim 1, wherein the core contains a non-polymerizable compound capable of forming a refractive index distribution by its concentration gradient.

4. The plastic optical fiber according to claim 3, wherein the non-polymerizable compound is at least one compound selected from the group consisting of diphenyl sulfide, benzyl benzoate, triphenyl phosphate, dibutyl phthalate and tricresyl phosphate.

5. The plastic optical fiber according to claim 3, wherein the non-polymerizable compound is a fluorinated polycyclic compound which has at least three carbon rings or heterocyclic rings and which has substantially no hydrogen atom.

6. The plastic optical fiber according to claim 3, wherein the non-polymerizable compound is a chlorotrifluoroethylene oligomer.

7. The plastic optical fiber according to claim 1, wherein the core and the clad, respectively and independently, contain at least one polymer selected from the group consisting of an acrylic polymer, a polystyrene, a polynorbornene, a polycarbonate, a polyimide and a polyester.

8. The plastic optical fiber according to claim 1, wherein the core and the clad, respectively and independently, contain a fluoropolymer having substantially no hydrogen atom.

9. The plastic optical fiber according to claim 1, wherein g has a value from 1.0 to 5.0.

10. The plastic optical fiber according to claim 1, wherein g has a value from 1.8 to 3.0.

11. The plastic optical fiber according to claim 1, wherein g has a value of 2.4.

12. The plastic optical fiber according to claim 1, wherein ρ has a value larger than 1 and at most 2.

13. The plastic optical fiber according to claim 1, wherein ρ has a value from 1.2 to 1.8.

* * * * *